United States Patent [19]
Barnes

[11] Patent Number: 6,122,315
[45] Date of Patent: Sep. 19, 2000

[54] MEMORY MANAGER FOR MPEG DECODER

[75] Inventor: David A Barnes, Irvine, Calif.

[73] Assignee: Discovision Associates, Irvine, Calif.

[21] Appl. No.: 08/834,158

[22] Filed: Apr. 14, 1997

[30] Foreign Application Priority Data

Feb. 26, 1997 [GB] United Kingdom ............... 9704027

[51] Int. Cl.$^7$ ...................................... H04N 7/12
[52] U.S. Cl. ......................... 375/240; 348/426; 348/714
[58] Field of Search ................... 348/400, 390, 348/403, 409, 424, 714, 426, 716, 420, 845, 384, 718; 382/241, 41; 395/425; 364/715.02; H04N 7/12

[56] References Cited

U.S. PATENT DOCUMENTS

| | | | |
|---|---|---|---|
| 4,689,823 | 8/1987 | Wojcik et al. | 382/41 |
| 4,692,880 | 9/1987 | Merz et al. | 364/521 |
| 4,799,056 | 1/1989 | Hattori et al. | 340/799 |
| 5,161,221 | 11/1992 | Van Nostrand | 395/425 |
| 5,174,641 | 12/1992 | Lim | 358/141 |
| 5,200,925 | 4/1993 | Morooka | 365/219 |
| 5,274,788 | 12/1993 | Koike | 395/425 |
| 5,287,470 | 2/1994 | Simpson | 395/425 |
| 5,297,271 | 3/1994 | Bhayani | 395/425 |
| 5,319,460 | 6/1994 | Kubo | 348/715 |
| 5,321,806 | 6/1994 | Meinerth et al. | 395/162 |
| 5,357,606 | 10/1994 | Adams | 395/164 |
| 5,369,418 | 11/1994 | Richards | 345/185 |
| 5,396,592 | 3/1995 | Fujimoto | 395/162 |
| 5,430,488 | 7/1995 | Hedley | 348/446 |
| 5,446,866 | 8/1995 | Drako et al. | 395/500 |
| 5,457,482 | 10/1995 | Rhoden et al. | 345/201 |
| 5,488,432 | 1/1996 | Guillon et al. | 348/717 |
| 5,495,291 | 2/1996 | Adams | 348/390 |
| 5,502,494 | 3/1996 | Auld | 348/426 |
| 5,553,005 | 9/1996 | Voeten et al. | 364/514 |
| 5,572,691 | 11/1996 | Koudmani | 395/405 |
| 5,828,425 | 10/1998 | Kim | 348/845 |
| 5,838,597 | 11/1998 | Pau et al. | 364/715.02 |
| 5,844,614 | 12/1998 | Chong et al. | 348/420 |
| 5,883,670 | 3/1999 | Sporer et al. | 348/384 |
| 5,912,676 | 6/1999 | Malladi et al. | 348/718 |
| 5,963,260 | 10/1999 | Bakhmutsky | 348/420 |

FOREIGN PATENT DOCUMENTS 1 243 631   8/1971   United Kingdom .

*Primary Examiner*—Vu Le
*Assistant Examiner*—Luanne P. Din
*Attorney, Agent, or Firm*—Keiji Masaki; Donald Bollella; Richard Stokey

[57] ABSTRACT

An MPEG decoder operates in 2.5 frame store mode, and has an efficient memory management which allows a B picture to be stored and displayed while simultaneously making use of a portion of the frame store memory. The video frame is treated as a grid, having rows of 8×8 pixel blocks. The pixel blocks are manipulated in three FIFOs which are cross-connected in a closed loop. Two processes operate on the memory so arranged: (1) a video reconstruction process which writes data into the memory, and (2) a display process, which accesses the memory and writes the video frame into another, external memory in a rastered format. One of the three cross-coupled FIFOs is designated for write-back, and the other two for reading 2:1 interlaced raster data. The two FIFOs utilized for the raster operation are allocated to the alternate lines of the picture.

21 Claims, 26 Drawing Sheets

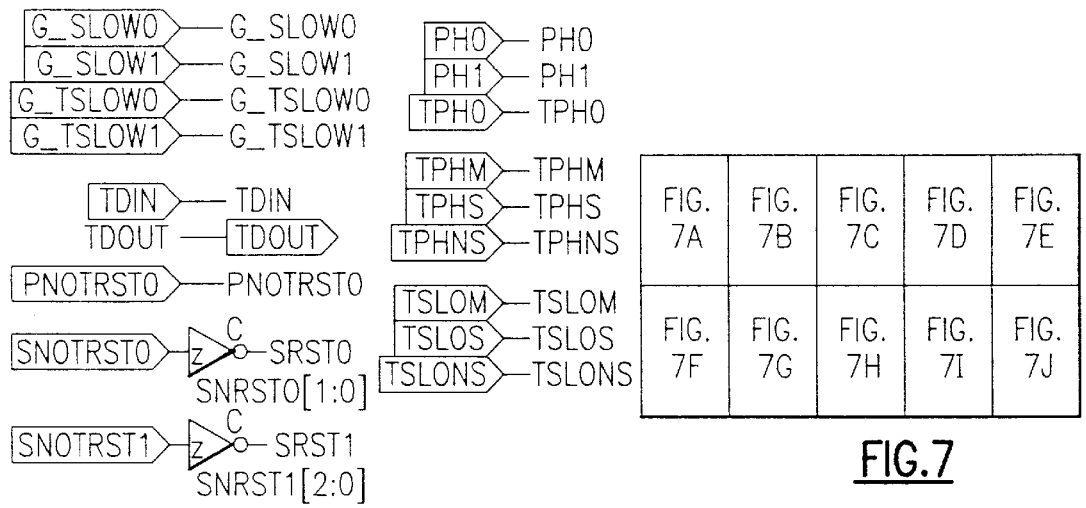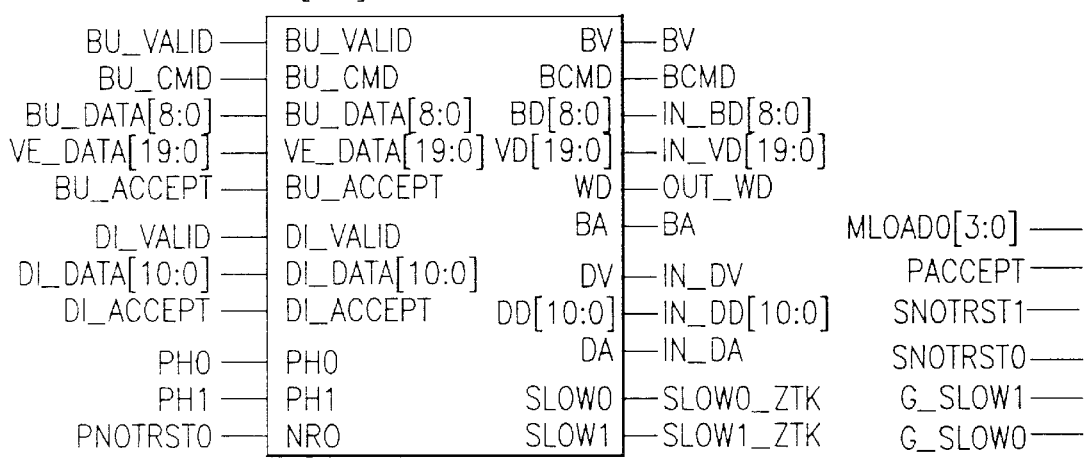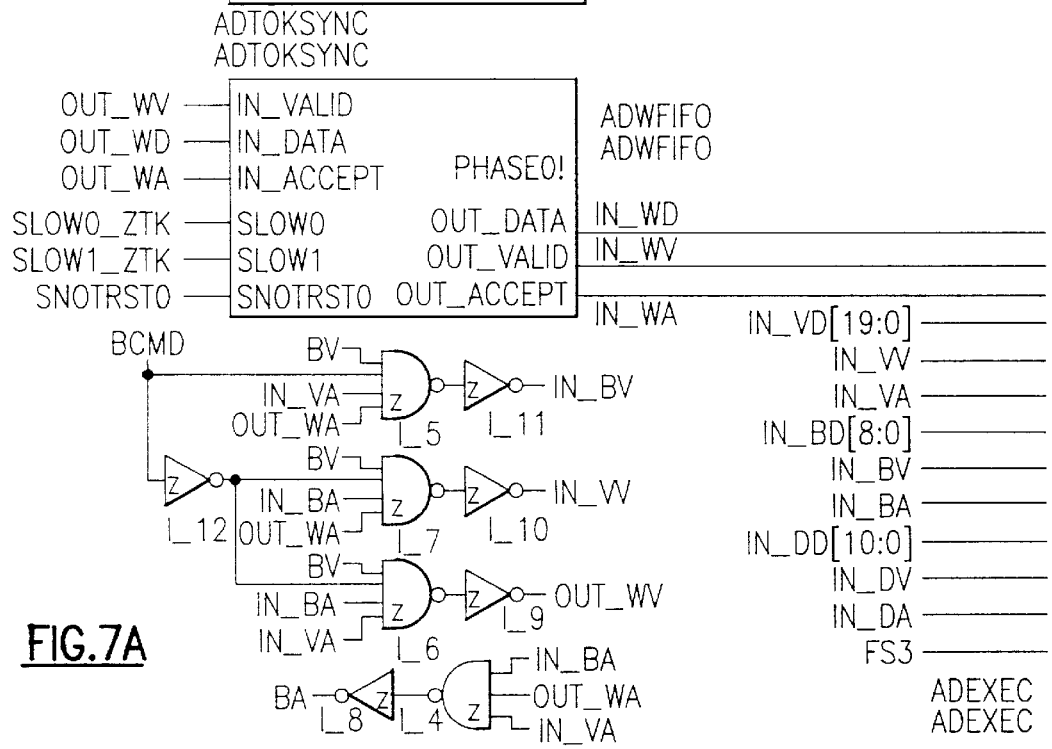
FIG.7A

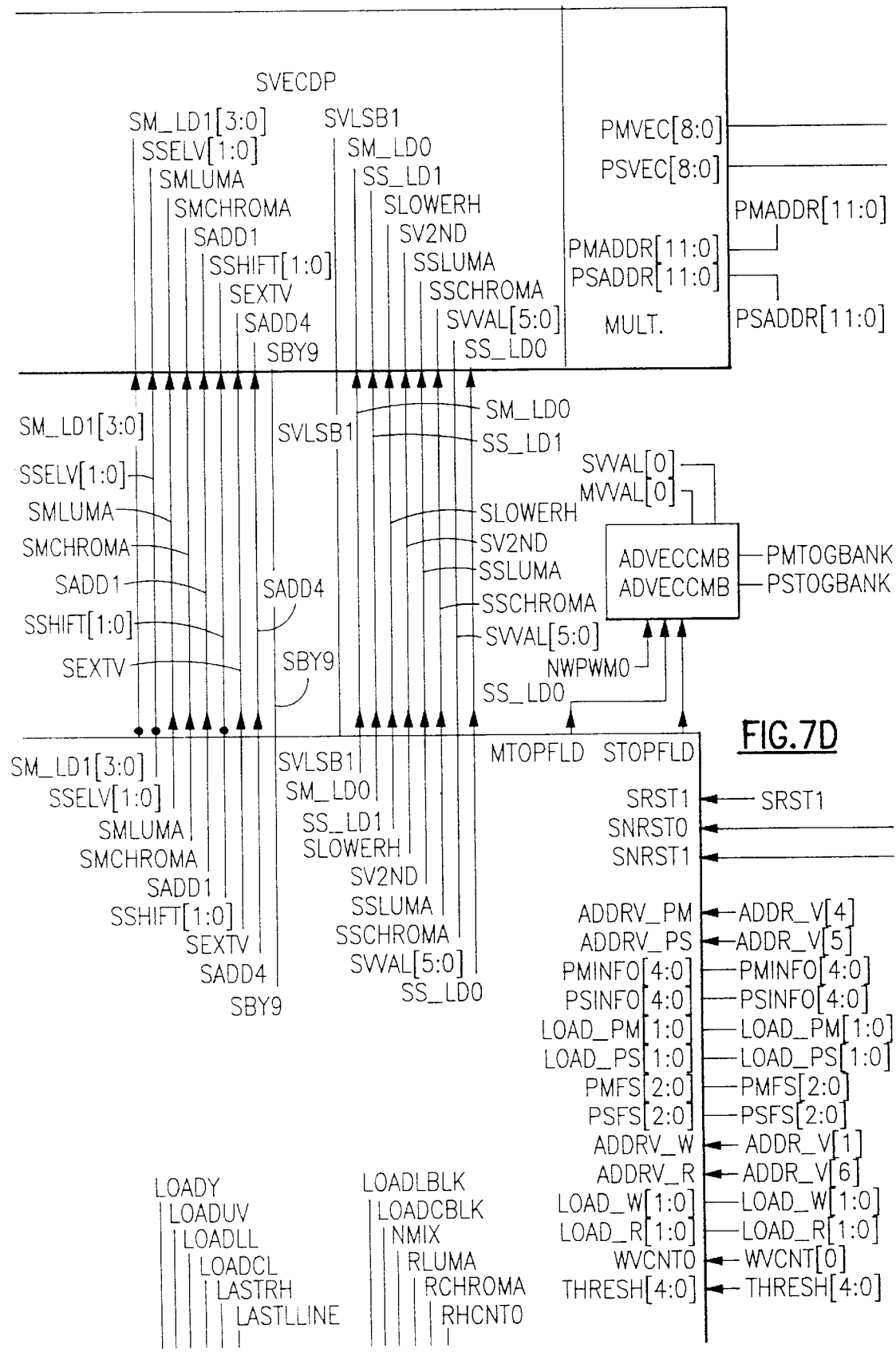

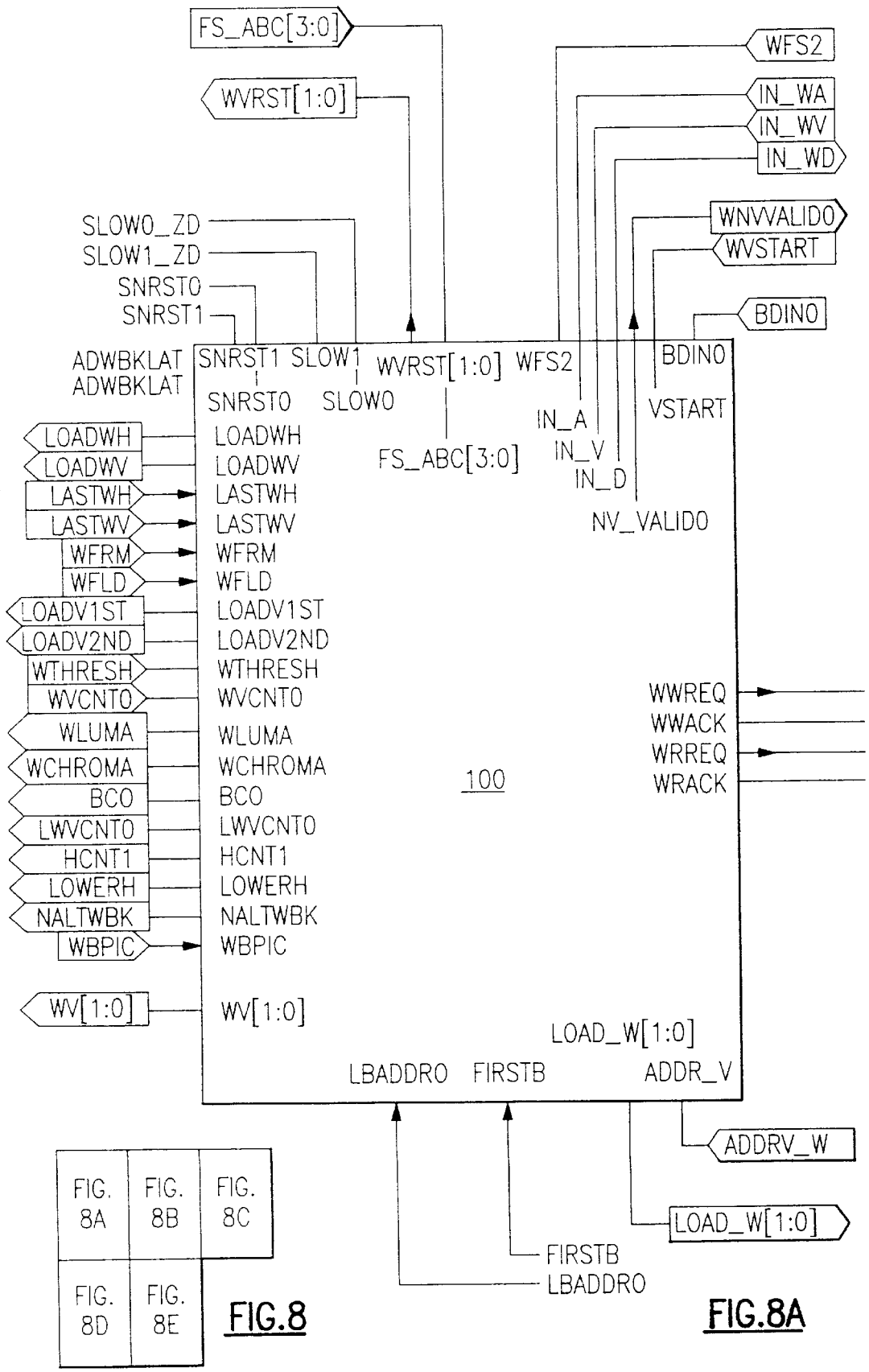

MEMORY MANAGER FOR MPEG DECODER

CROSS-REFERENCE TO RELATED APPLICATIONS

The following U.S. patent applications have subject matter related to this application: application Ser. No. 08/382,958, filed Feb. 2, 1995 now abandoned; Ser. No. 08/400,397, filed Mar. 7, 1995; Ser. No. 08/399,851 filed Mar. 7, 1995 now abandoned; Ser. No. 08/482,296, filed Jun. 7, 1995; Ser. No. 08/486,396, filed Jun. 7, 1995 now abandoned; Ser. No. 08/484,730, filed Jun. 7, 1995; Ser. No. 08/479,279, filed Jun. 7, 1995 now U.S. Pat. No. 5,805,914; Ser. No. 08/483,020, filed Jun. 7, 1995; Ser. No. 08/487,224, filed Jun. 7, 1995; Ser. No. 08/400,722, filed Mar. 7, 1995 now U.S. Pat. No. 5,596,517; Ser. No. 08/400,723, filed Mar. 7, 1995 now U.S. Pat. No. 5,594,678; Ser. No. 08/404,067, filed Mar. 14, 1995 now U.S. Pat. No. 5,590,067; Ser. No. 08/567,555, filed Dec. 5, 1995 now U.S. Pat. No. 5,617,458; Ser. No. 08/396,834, filed Mar. 1, 1995 now U.S. Pat. No. 5,677,648; Ser. No. 08/473,813, filed Jun. 7, 1995 now U.S. Pat. No. 5,821,885; Ser. No. 08/484,456, filed Jun. 7, 1995; Ser. No. 08/476,814, filed Jun. 7, 1995 now U.S. Pat. No. 5,798,719; Ser. No. 08/481,561, filed Jun. 7, 1995 now U.S. Pat. No. 5,801,973; Ser. No. 08/482,381, filed Jun. 7, 1995 now U.S. Pat. No. 5,828,907; Ser. No. 08/479,910, filed Jun. 7, 1995 now U.S. Pat. No. 5,768,629; Ser. No. 08/475,729, filed Jun. 7, 1995 now abandoned; Ser. No. 08/484,578, filed Jun. 7, 1995; Ser. No. 08/473,615, filed Jun. 7, 1995 now abandoned; Ser. No. 08/487,356, filed Jun. 7, 1995; Ser. No. 08/487,134, filed Jun. 7, 1995 now U.S. Pat. No. 5,835,792; Ser. No. 08/481,772, filed Jun. 7, 1995; Ser. No. 08/481,785, filed Jun. 7, 1995 now U.S. Pat. No. 5,703,793; Ser. No. 08/486,908, filed Jun. 7, 1995; Ser. No. 08/486,034, filed Jun. 7, 1995; Ser. No. 08/487,740, filed Jun. 7, 1995; Ser. No. 08/488,348, filed Jun. 7, 1995; Ser. No. 08/484,170, filed Jun. 7, 1995; Ser. No. 08/516,038, filed Aug. 17, 1995 now abandoned; Ser. No. 08/399,810, filed Mar. 7, 1995; Ser. No. 08/400,201, filed Mar. 7, 1995 (now U.S. Pat. No. 5,603,012); Ser. No. 08/400,215, filed Mar. 7, 1995 now abandoned; Ser. No. 08/400,072, filed Jun. 16, 1995 now U.S. Pat. No. 5,784,631; Ser. No. 08/402,602, filed Mar. 7, 1995; Ser. No. 08/400,206, filed Mar. 7, 1995 now abandoned; Ser. No. 08/400,151, filed Mar. 7, 1995; Ser. No. 08/400,202, filed Mar. 7, 1995; Ser. No. 08/400,398, filed Mar. 7, 1995 now abandoned; Ser. No. 08/400,161, filed Mar. 7, 1995; Ser. No. 08/400,141, filed Mar. 7, 1995; Ser. No. 08/400,211, filed Mar. 7, 1995 now U.S. Pat. No. 5,842,033; Ser. No. 08/400,331, filed Mar. 7, 1995; Ser. No. 08/400,207, filed Mar. 7, 1995 now abandoned; Ser. No. 08/399,898, filed Mar. 7, 1995; Ser. No. 08/399,665, filed Mar. 7, 1995 now abandoned; Ser. No. 08/400,058, filed Mar. 7, 1995 now abandoned; Ser. No. 08/399,800, filed Mar. 7, 1995; Ser. No. 08/399,801, filed Mar. 7, 1995; Ser. No. 08/399,799, filed Mar. 7, 1995 now abandoned; Ser. No. 08/474,222, filed Jun. 7, 1995; Ser. No. 08/486,481, filed Jun. 7, 1995 now abandoned; Ser. No. 08/474,231, filed Jun. 7, 1995; Ser. No. 08/474,830, filed Jun. 7, 1995 now abandoned; Ser. No. 08/474,220, filed Jun. 7, 1995 now U.S. Pat. No. 5,699,544; Ser. No. 08/473,868, filed Jun. 7, 1995; Ser. No. 08/474,603, filed Jun. 7, 1995; Ser. No. 08/485,242, filed Jun. 7, 1995 now U.S. Pat. No. 5,689,313; Ser. No. 08/477,048, filed Jun. 7, 1995 now abandoned; and Ser. No. 08/485,744, filed Jun. 7, 1995 now abandoned.

BACKGROUND OF THE INVENTION

1. Field of the Invention

This invention relates to video decompression. More particularly this invention relates to a video decoder, and to the management of memory being used to store decoded video frame pictures in an image formatter of a video decoder.

2. Description of the Related Art

Various compression standards for video data, i.e., JPEG, MPEG and H.261, are well known from U.S. Pat. No. 5,212,742. An important compression standard is the Moving Picture Experts Group Convention ("MPEG"), and more specifically MPEG-2 (ISO/IEC 13818). Circuitry used in decoders for MPEG-2 encoded video data is disclosed, for example, in European Patent Application No. 92306038.8, which is of common assignee herewith.

MPEG encoding involves three different picture types: Intra ("I"), Predicted ("P") and bidirectionally interpolated ("B"). B pictures are based on predictions from two pictures, one picture from the future and one from the past. I pictures require no further decoding by the Temporal Decoder, but must be stored in one of the two picture buffers for later use in decoding P and B pictures. The picture order is modified at the encoder so that I and P picture can be decoded from the coded date before they are required to decode B pictures. Decoding P pictures requires forming predictions from a previously decoded P or I picture. The decoded P picture is stored in picture buffers for use decoding P and B pictures.

B pictures can require predictions from the picture buffers. As with P pictures, half pixel motion vector resolution accuracy requires on chip interpolation of the picture information. B pictures are not stored in the buffers. They are merely transient.

In MPEG decoding a temporal and a spatial decoder are typically provided. The Spatial Decoder employed in the present invention performs all the required processing within a single picture, which reduces the redundancy within one picture. The Temporal Decoder reduces the redundancy between the subject picture and a picture which arrives prior to the arrival of the subject picture, as well as a picture which arrives after the arrival of the subject picture.

FIG. 1 illustrates how an I picture 2 is stored in a picture buffer 4, and then output. FIG. 2 shows how a P picture 6 is formed from a picture buffer 8, stored in a second picture buffer 10, and then output. FIG. 3 illustrates how a B picture 12 is constructed from information in two picture buffers 14, then output without being stored.

I and P pictures are usually not output from the temporal decoder as they are decoded. Instead, I and P pictures are written into one of the picture buffers, and are read out only when a subsequent I or P picture arrives for decoding. In other words, the temporal decoder relies on subsequent P or I pictures to flush previous pictures out of the two picture buffers. The spatial decoder can provide a dummy I or P picture at the end of a video sequence to flush out the last P or I picture. In turn, this dummy picture is flushed when a subsequent video sequence starts.

Peak memory bandwidth load occurs when decoding B pictures. In an example taken from the "worst case" scenario, the B frame may be formed from predictions from two picture buffers with all predictions being to half pixel accuracy. Table 1 presents performance data using a typical dynamic random access memory ("DRAM").

TABLE 1

| Data bus width (bits) | read or write 8 × 8 block | form prediction (half pixel accuracy) | form prediction (integer pixel accuracy) |
|---|---|---|---|
| 8 | 3657 ns | 4907 ns | 3963 ns |
| 16 | 1880 ns | 2907 ns | 2185 ns |
| 32 | 991 ns | 1907 ns | 1741 ns |

From the data in Table 1, it can be seen that it will take the decoder's DRAM interface 3815 ns to read the data required for two accurate half pixel accurate predictions (via a 32 bit wide interface). The resolution that the Temporal Decoder can support is determined by the number of these predictions that can be performed within one picture time. In this example, the Temporal Decoder can process 8737 8×8 blocks in a single 33 ms picture period (e.g., for 30 Hz video).

If the required video format is 704×480, then each picture contains 7920 8×8 blocks (taking into consideration the 4:2:0 chroma sampling). It can be seen that this video format consumes approximately 91% of the available DRAM interface bandwidth (before any other factors such as DRAM refresh are taken into consideration). Accordingly, the Temporal Decoder can support this video format.

When MPEG picture re-ordering is employed the worst case scenario is encountered while P pictures are being decoded. During this time, there are 3 loads on the DRAM interface: (1) form predictions; (2) writing back the result; and (3) reading out the previous P or I picture.

Using the data from Table 1, the time for each of these tasks can be determined when a 32 bit wide interface is available. Forming the prediction takes 1907 ns/n while the read and the write each take 991 ns, a total of 3889 ns. This permits the Temporal Decoder to process 8485 8×8 blocks in a 33 ms period. Hence, processing 704×480 video will use approximately 93% of the available memory bandwidth (ignoring refresh).

A block diagram of a conventional decoder system 16 is presented in FIG. 4. Currently it is common to employ a synchronous DRAM as the DRAM 18 which is used in the video formatter 20. The spatial decoder 22, and the temporal decoder 24 utilize DRAMs 26, 28 respectively. During the MPEG decoding process up to three frame stores may be required to be stored in the DRAM 18. The DRAM interface 30 is particularly important in achieving acceptable performance. In the well known National Television System Committee ("NTSC") convention, this requirement amounts to 4 megabits/frame, for a total of 12 megabits. For the Phase Alternation Line ("PAL") convention, the frame size is approximately 5 megabits, so that 15 megabits of memory is needed in the DRAM 18. Commercial decoder systems have implemented the DRAM 18 as a 16 megabit random access memory ("RAM"), for reason of ready availability. However in the worst case, only 1 megabit of RAM remains for other processing functions of the video formatter 20, which is insufficient. Provision of an adequate amount of memory results in operation in a "4.3 frame store mode". Hence it has been necessary to provide another RAM (not shown), usually 4 megabits in size to accommodate the video formatter 20. The 4 megabit memory is larger than necessary, but is utilized because, as is the case of the 16 megabit RAM, it is an off-the-shelf component. In very large scare integrated circuit ("VLSI") realizations of an MPEG decoder, it is desirable to generally reduce the amount of memory for reasons of cost, power consumption, and space utilization.

The video formatter 20 processes data from the spatial decoder 22 and the temporal decoder 24. A digital video frame is treated as a grid of picture elements, or pixels. The pixels are grouped into 8×8 blocks, and the blocks are further grouped into 2×2 units, known as macroblocks. Thus a macroblock represents a grouping of 16×16 pixels, or a grouping of 2×2 blocks. A PAL picture constitutes 45×36 macroblocks, and an NTSC picture is 45×30 macroblocks. Referring to FIG. 5, each macroblock 32 comprises four luminance blocks 34 and two chrominance blocks 36, and contains the information for an original 16×16 grouping of pixels. Each of the four luminance blocks 34 and two chrominance blocks 36 is 8×8 pixels in size. The four luminance blocks 34 contain a 1 pixel to 1 pixel mapping of the luminance (Y) information from the original 16×16grouping of pixels. One chrominance block 36 contains a representation of the chrominance level of the blue color signal (Cu/b), and the other chrominance block 36 contains a representation of the chrominance level of the red color signal (Cv/r). Each chrominance level is subsampled such that each 8×8 chrominance block 36 contains the chrominance level of its color signal for the entire original 16×16 block of pixels.

More recently it has become possible to compress one of the noted three frame stores (the "B frame store"). When this is done the decoder is said to operate in "2.5 frame store mode". This is desirable because in the case of an NTSC signal, only 10 megabits of memory is required in the DRAM 18, and in the case of PAL, 12.5 megabits. A practical import is the ability to decode PAL pictures in a single 16 megabit memory. However memory management in the 2.5 frame store mode has presented considerable difficulties, because the MPEG algorithm may require the video formatter 20 to process an extensively intermingled sequence of I, P, and B pictures. Each type of picture undergoes distinct processing. Furthermore if the process of decoding a subsequent picture is delayed, it may be necessary to redisplay one or more fields of a current picture which places further demands on the decoder's memory management.

SUMMARY OF THE INVENTION

It is therefore a primary object of the present invention to improve the efficiency of memory management in the video formatter of an MPEG decoder.

It is another object of the invention to provide a memory manager for an MPEG decoder which allows rapid and efficient operation in 2.5 frame store mode.

It is yet another object of the invention to minimize the size, cost, and power consumption of memory units in an MPEG decoder.

These and other objects of the present invention are attained by an improved MPEG decoder operating in 2.5 frame store mode, and having an efficient memory management which allows a picture, particularly a B picture, to be stored and displayed, while simultaneously making use of a portion of the frame store memory. The video frame is treated as a grid, having rows of 8×8 pixel blocks referred to herein as "slices", or "block rows" of memory. The slices are manipulated in cross-coupled buffers which are each configured as a first-in first-out ("FIFO"), and cross-connected in a closed loop. Two processes operate on the memory so arranged: (1) a video reconstruction process which writes data into the memory ("write-back"), and (2) a display process, which accesses the memory and writes the video frame into another, external memory in a rastered format ("raster"). In the preferred embodiment there are three cross-coupled FIFOs, one designated for write-back, and the other two for reading 2:1 interlaced raster data. The two FIFOs utilized for the raster operation are allocated to the alternate lines of the picture.

According to the invention a video decoder includes a spatial decoder, a temporal decoder, a video formatter, and a data memory for storing the received data. The video formatter receives data from at least one of the temporal decoder and the spatial decoder. A memory manager for the video formatter uses a writeback memory, a first raster memory, and a second raster memory, wherein pointers to the data memory are stored in the writeback memory. The number of locations in the writeback memory is smaller than the sum of locations in the first raster memory and the second raster memory. A memory interface is coupled to the first raster memory, the second raster memory, the data source, the data memory, and the writeback memory. A writeback control circuit is provided for extracting pointers, preferably virtual memory pointers, from the writeback memory, wherein the extracted pointers are presented to the memory interface, and the received data is stored in locations of the data memory that are specified by the extracted pointers. The extracted pointers are transferred to the raster memory. A raster control circuit is provided for re-extracting the transferred pointers from the raster memory for presentation to the memory interface, wherein the received data is read from the data memory, and the re-extracted pointers are returned to the writeback memory.

Preferably the writeback memory, the first raster memory, and the second raster memory are FIFOs, which in one embodiment can be statically configured, and can be realized as a single RAM.

According to another aspect of the invention control circuitry is provided for dynamically configuring the FIFOs.

According to another aspect of the invention the writeback memory, the first raster memory, and the second raster memory are realized as a content addressable memory.

According to yet another aspect of the invention the writeback memory, the first raster memory, and the second raster memory are realized as a register file.

According to another aspect of the invention the data memory has a plurality of banks.

According to still another aspect of the invention the writeback memory, the first raster memory, and the second raster memory are cross-coupled FIFO memories for storage of pointers to the data memory. The FIFO memories each have a read pointer, a write pointer, and a status flag, and have control circuitry for initializing the read pointers, the write pointers, and the status flags of the FIFO memories, wherein the pointers are transferred between the writeback memory and the raster memories in a closed system.

According to an aspect of the invention there is a control circuit that asserts a lock signal when a decoded video field is required to be redisplayed by the video formatter causing the write pointer of a raster FIFO to be held stationary.

The invention provides a method of managing a memory holding decoded video data for display thereof. It is performed by decoding MPEG encoded video data in at least one of the spatial decoder and the temporal decoder, wherein the decoded data represents a picture to be displayed; storing the decoded video data in a data memory; storing pointers to locations of the data memory in a writeback memory; extracting the stored pointers from the writeback memory; writing the received video data into locations of the data memory that are specified by the extracted pointers; transferring the extracted pointers to at least one raster memory, wherein pointers stored in the first raster memory correspond to decoded video data of a first video display field, and pointers stored in the second raster memory correspond to decoded video data of a second video display field; reading data from locations of the data memory that are specified by the transferred pointers; outputting the read data for display thereof; and returning the transferred pointers to the writeback memory.

The steps of extracting the pointers and writing the received video data are performed while simultaneously transferring the extracted pointers, reading data, outputting the read data, and returning the extracted pointers.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

Figure 1:
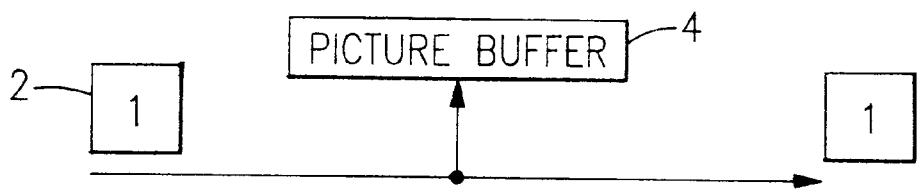
FIG. 1 is a diagram describing the storage of MPEG "I" pictures in the decoder according to the invention.
Figure 2:
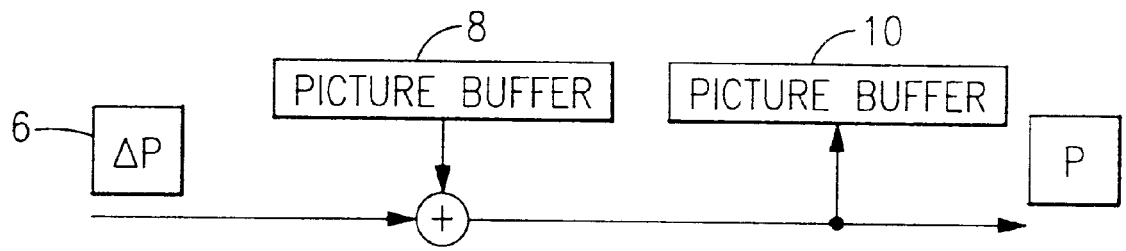
FIG. 2 is a diagram describing the storage of MPEG "P" pictures in the decoder according to the invention.
Figure 3:
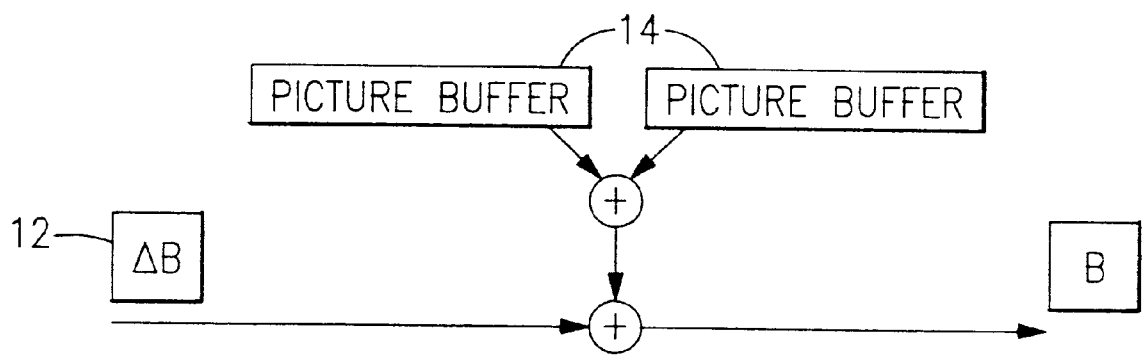
FIG. 3 is a diagram describing the storage of MPEG "B" pictures in the decoder according to the invention.
Figure 4:
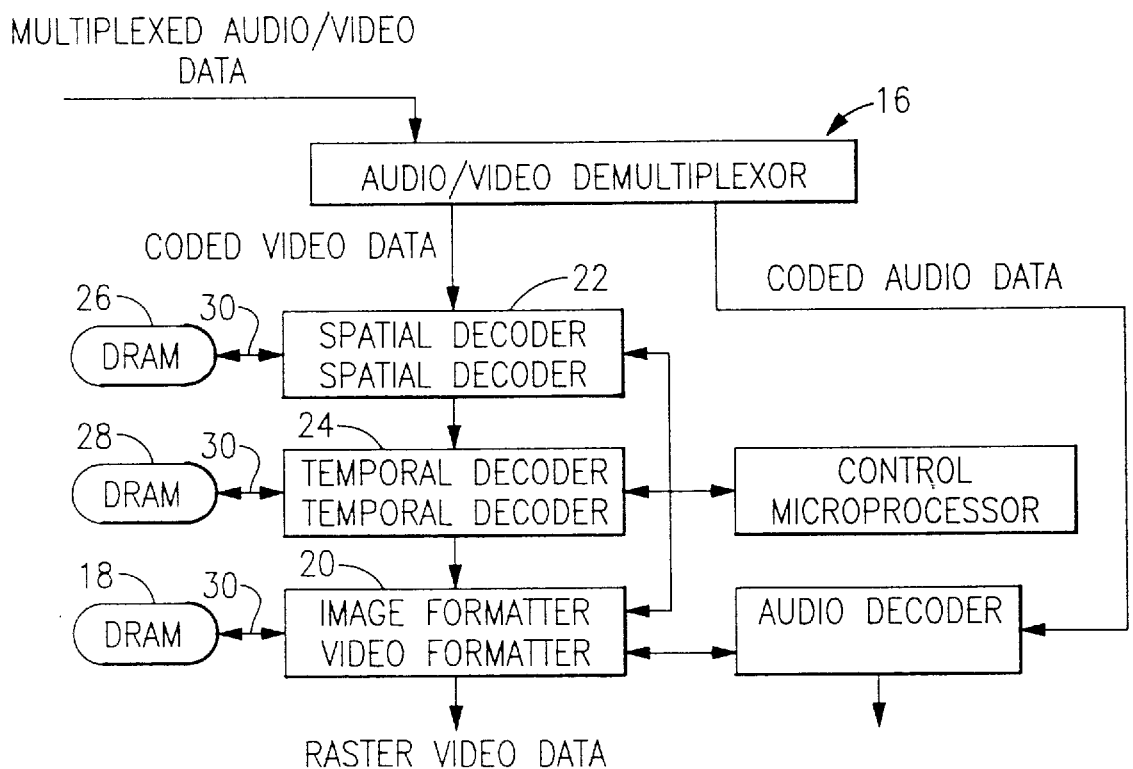
FIG. 4 is a block diagram of an MPEG decoder in accordance with the prior art.
Figure 5:
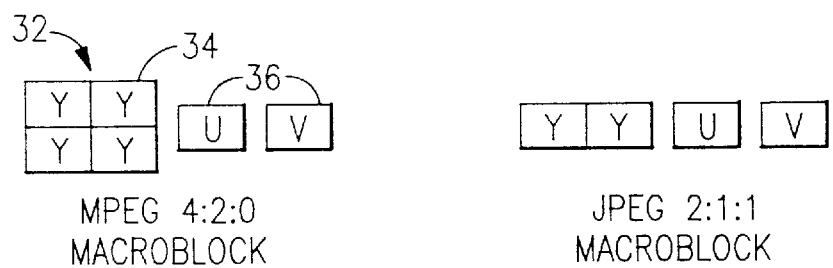
FIG. 5 is a diagram of MPEG and JPEG macroblock structure in accordance with the prior art.
Figure 6:
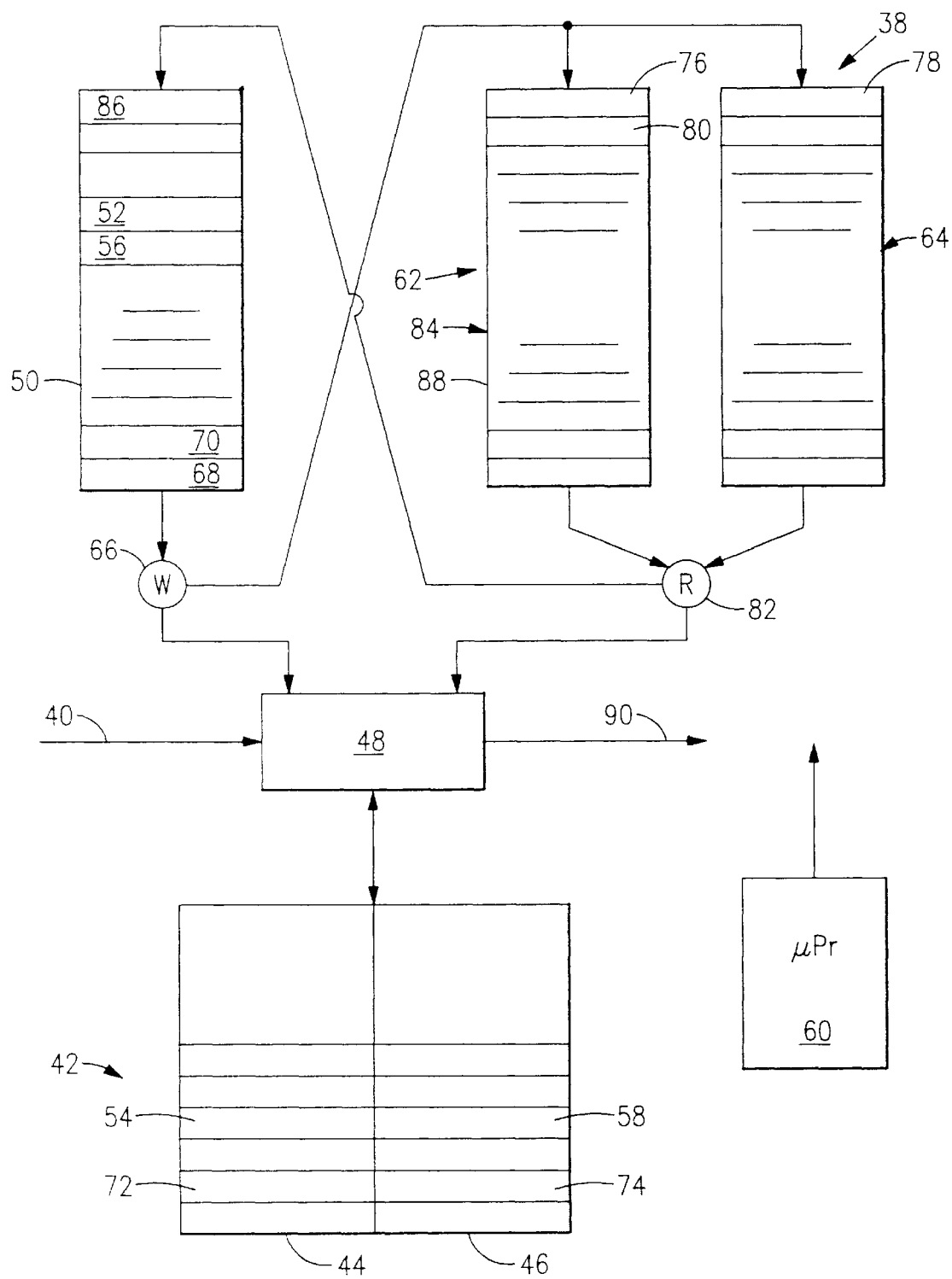
FIG. 6 is a block diagram of the memory manager in a video formatter of an MPEG decoder according to the invention.
Figure 7B:
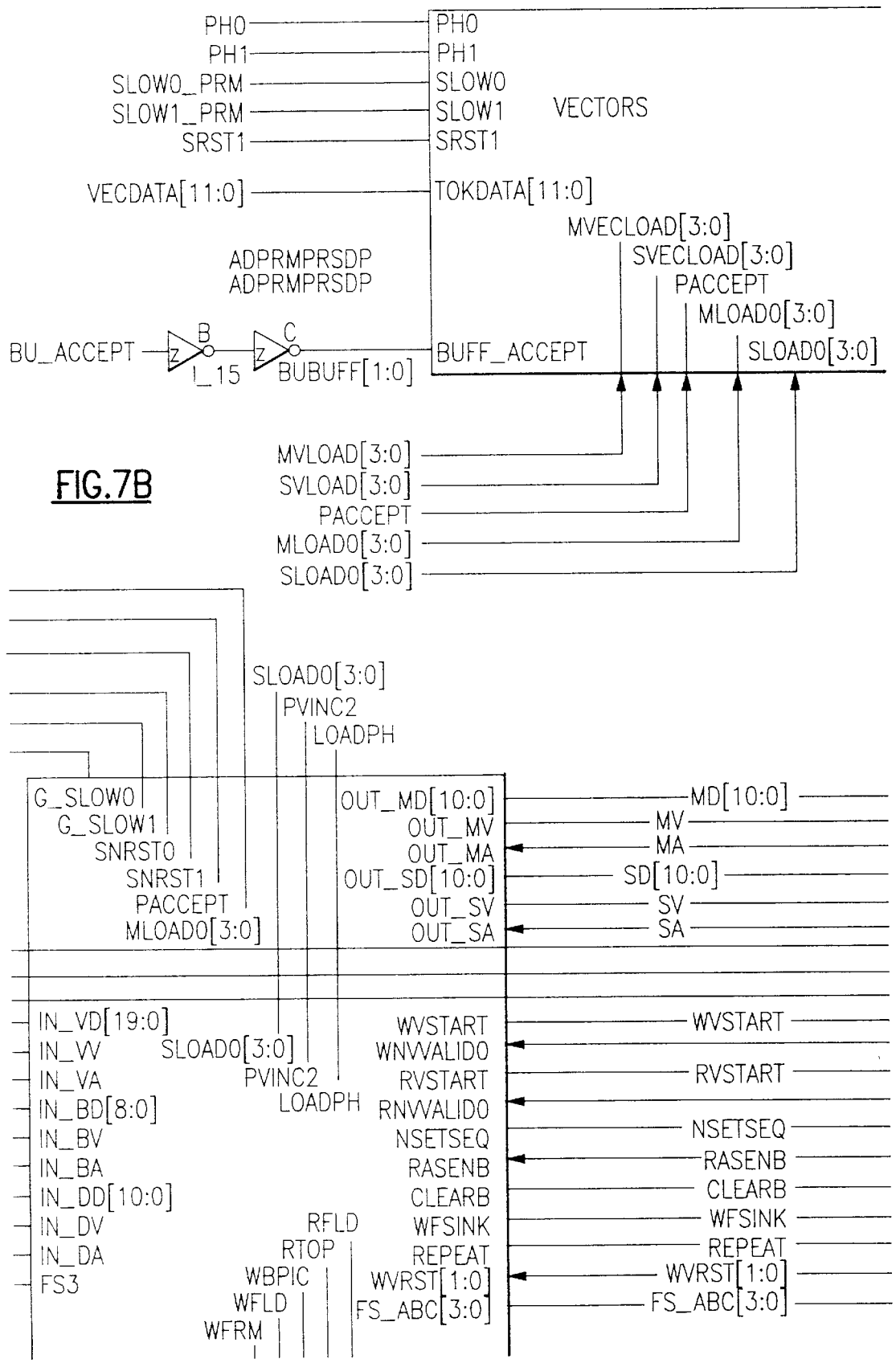
FIG. 7 is an electrical schematic of the memory manager shown in FIG. 6.
Figure 7C:
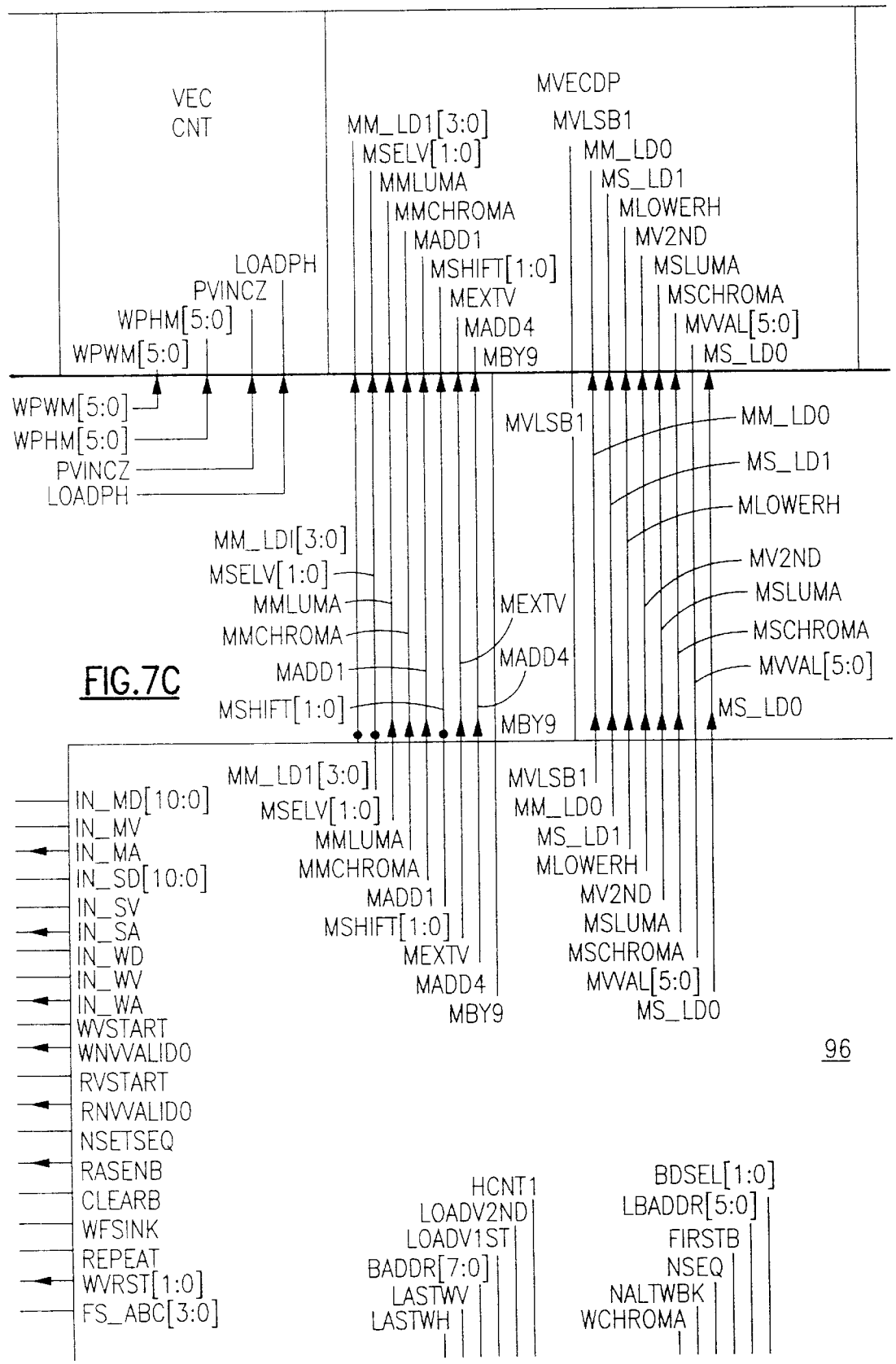
Figure 7E:
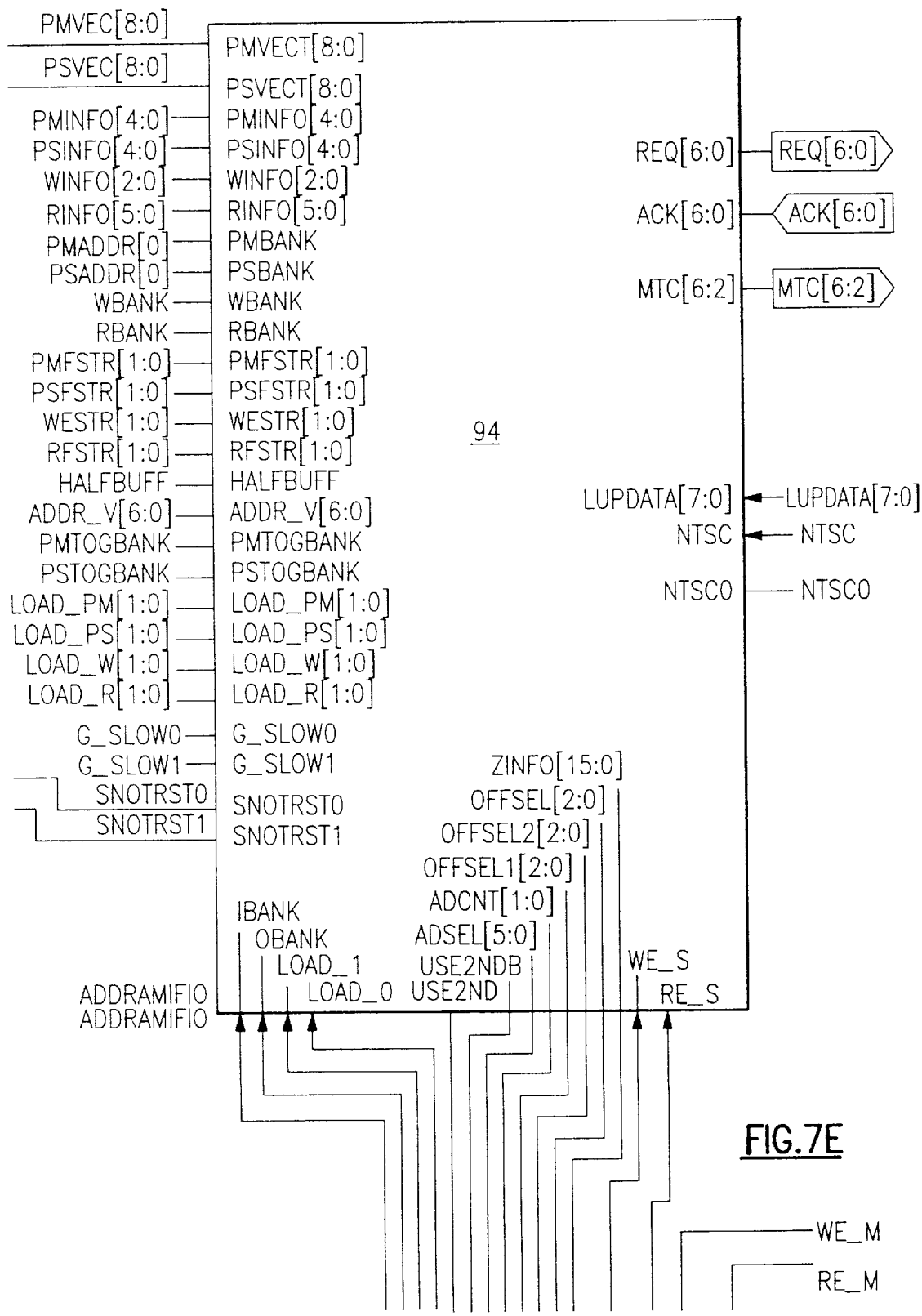
Figure 7F:
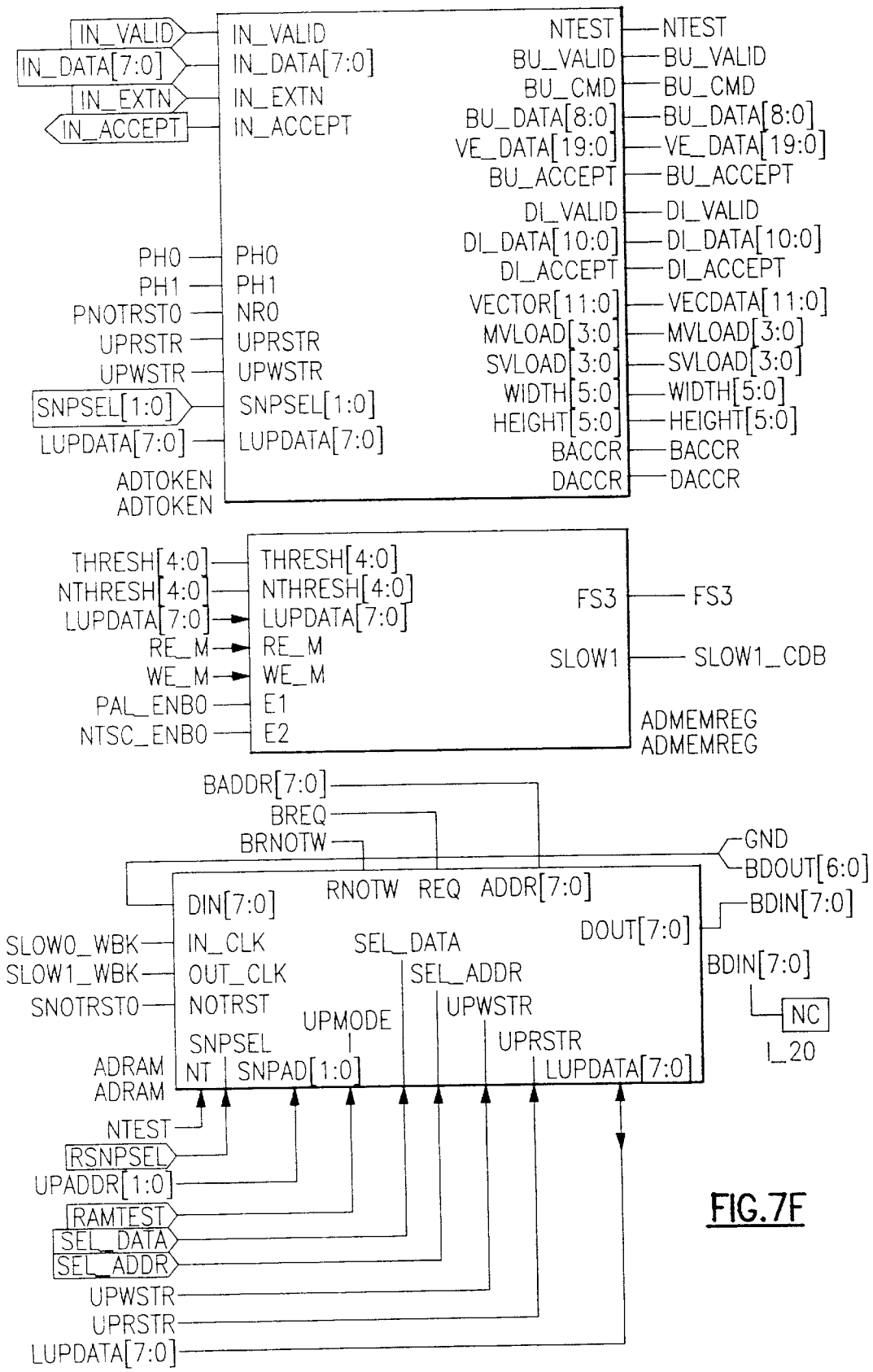
Figure 7G:
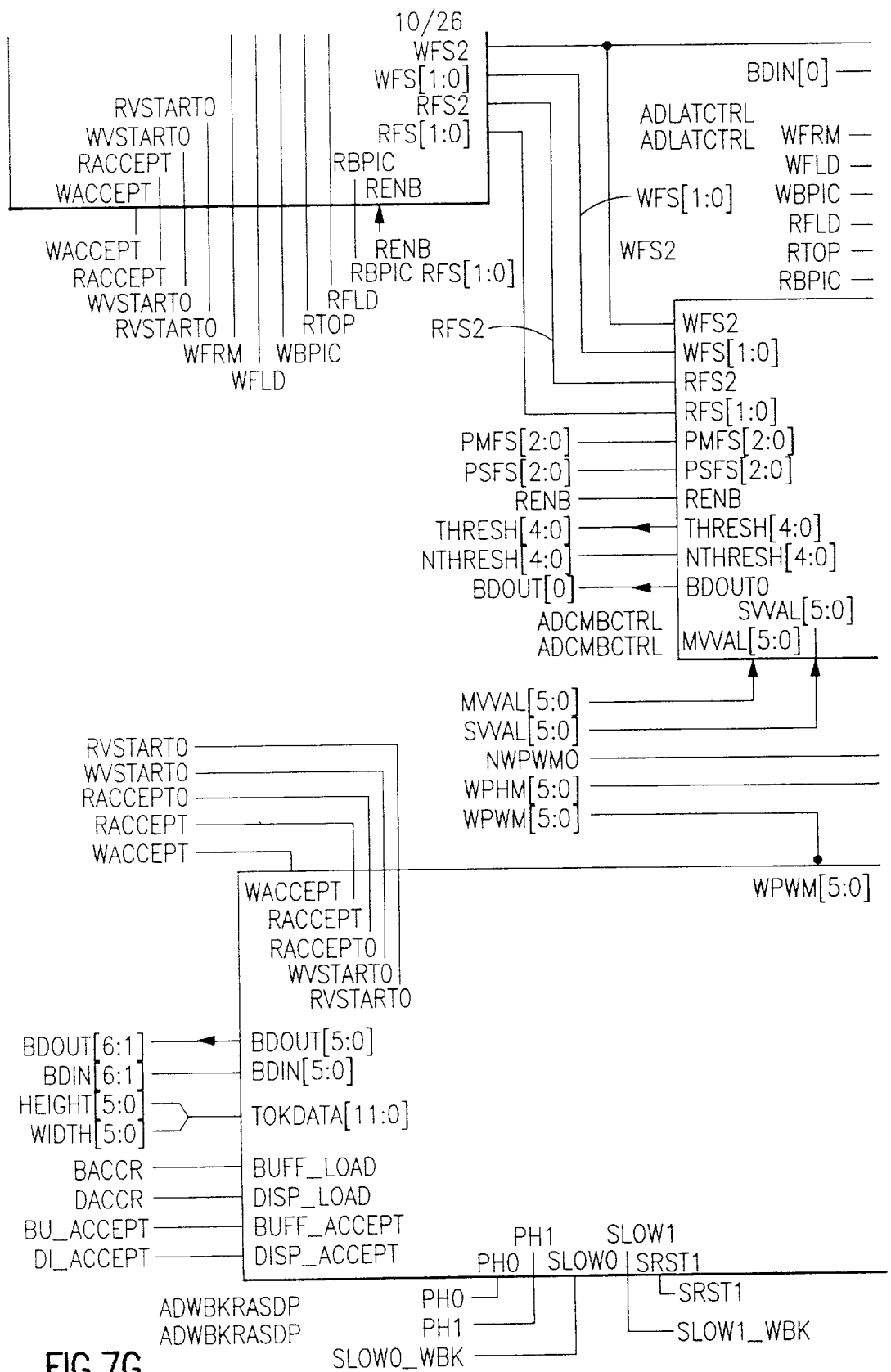
Figure 7H:
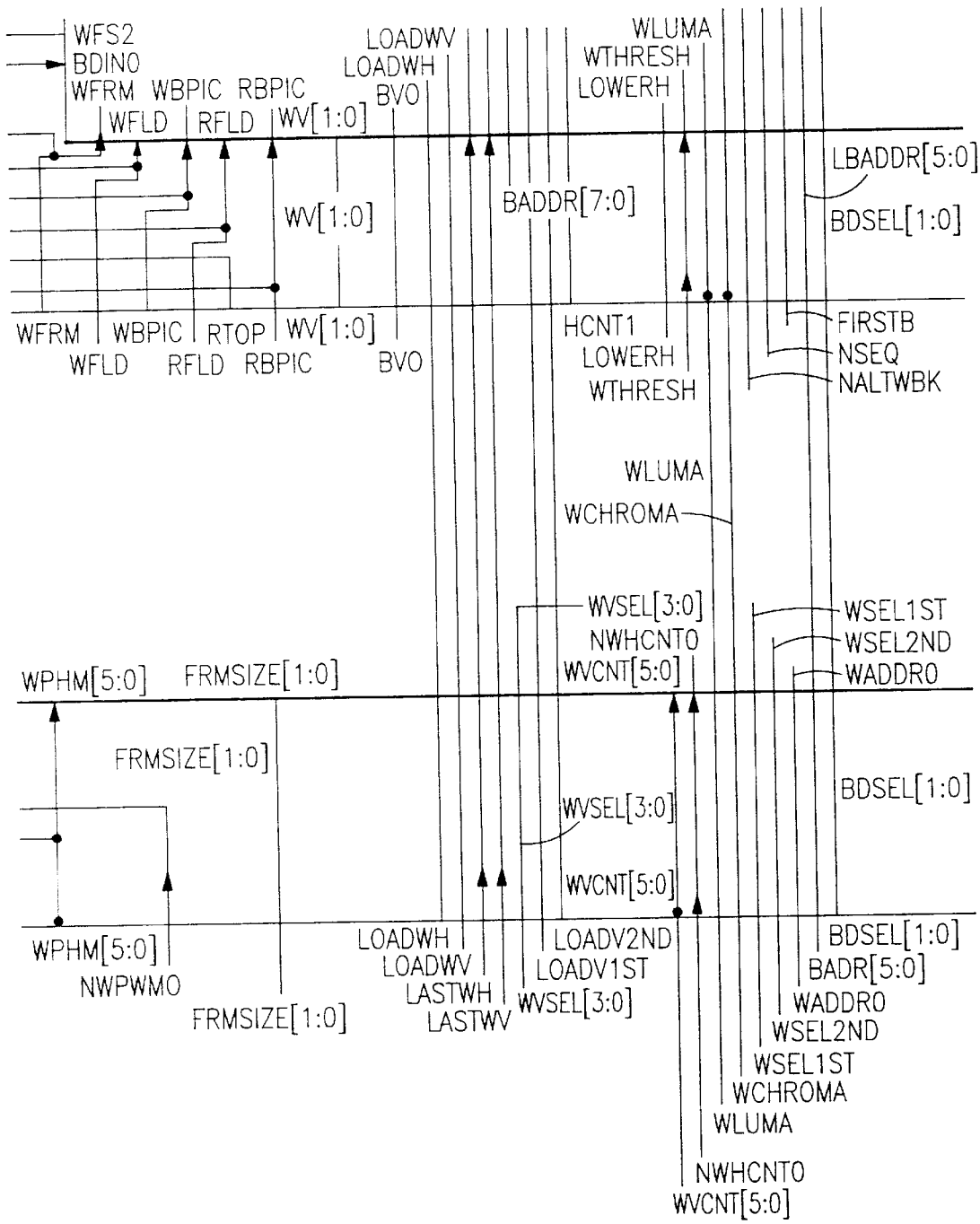
Figure 71:
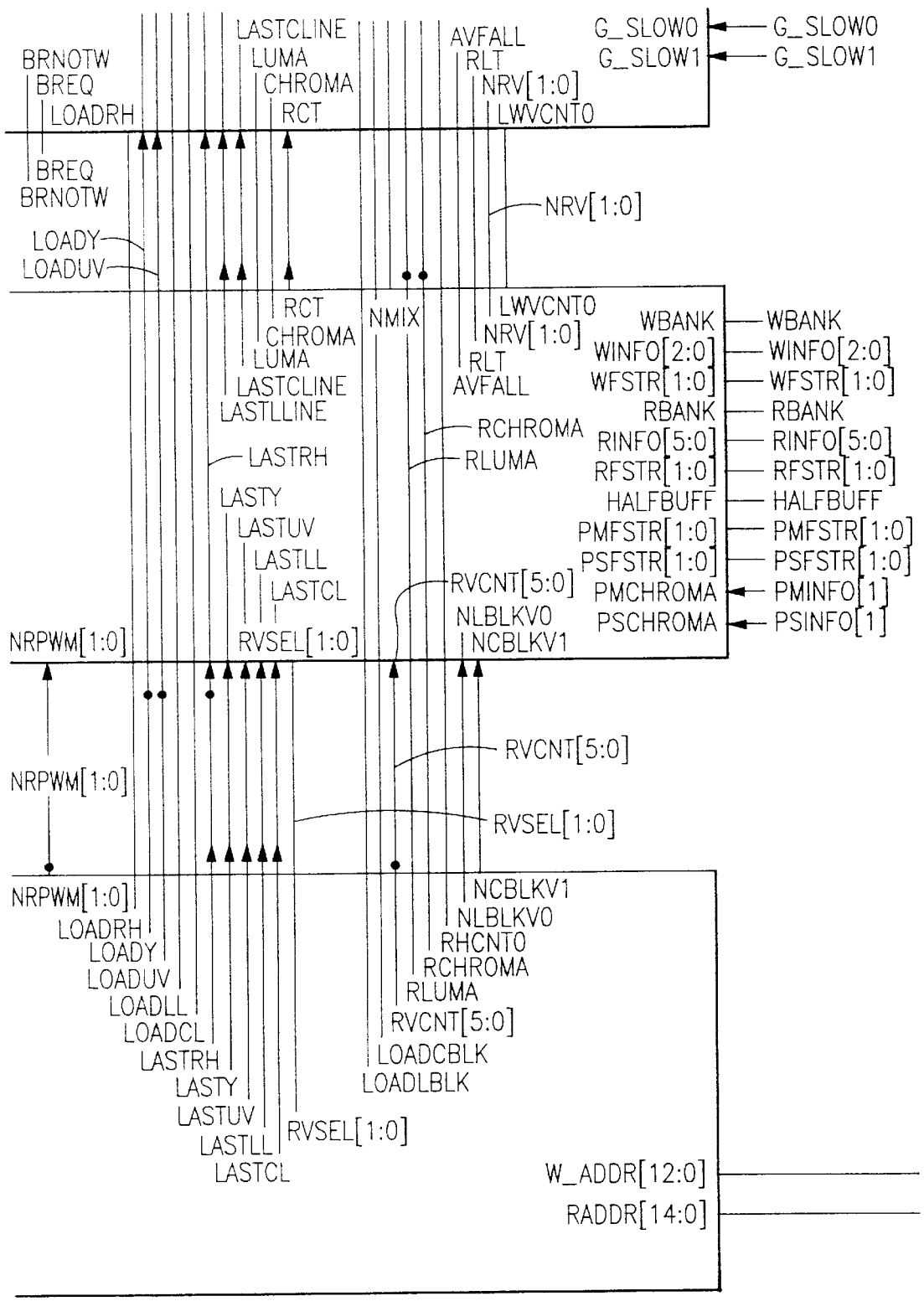
Figure 7J:
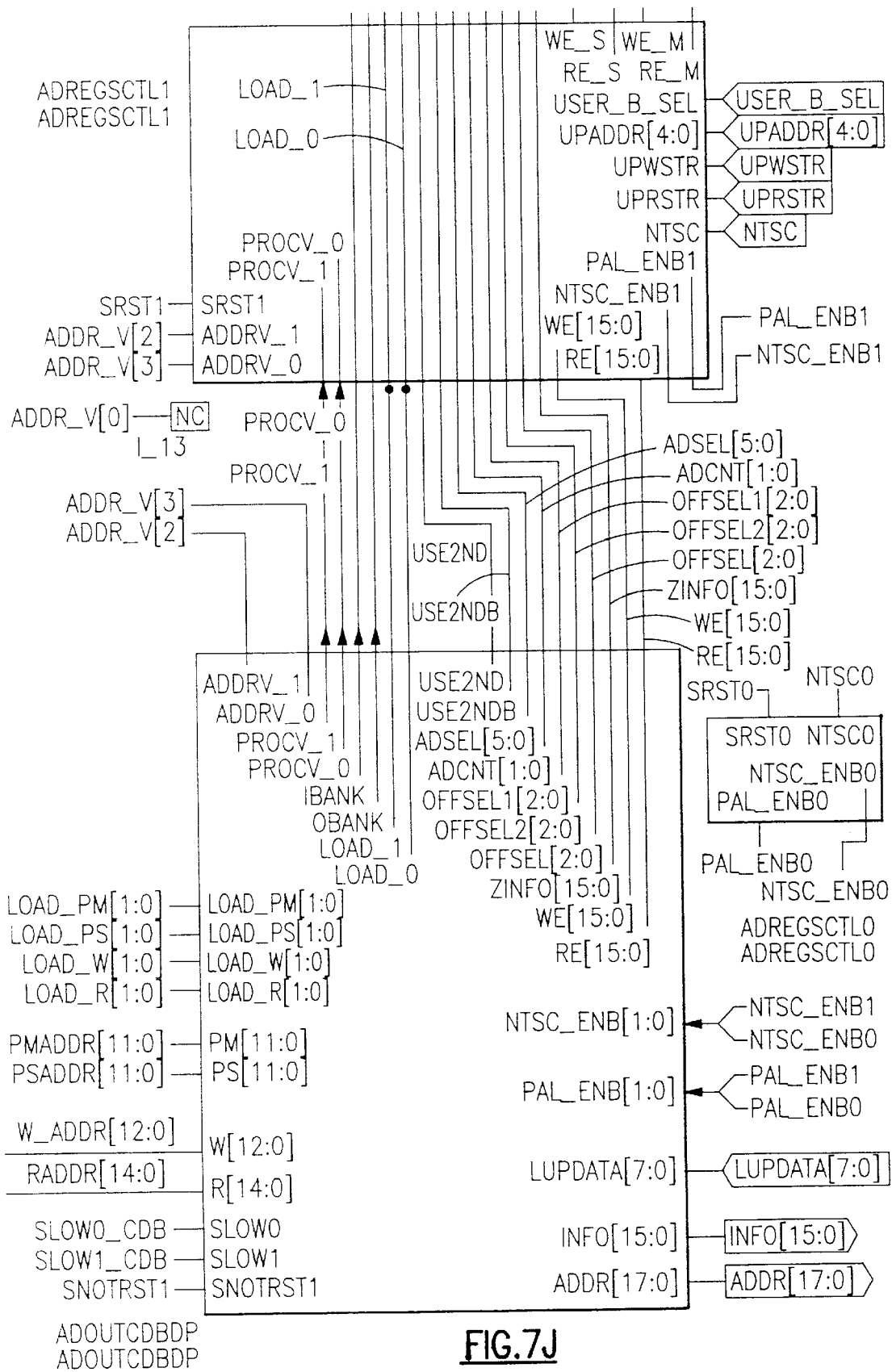
Figure 8B:
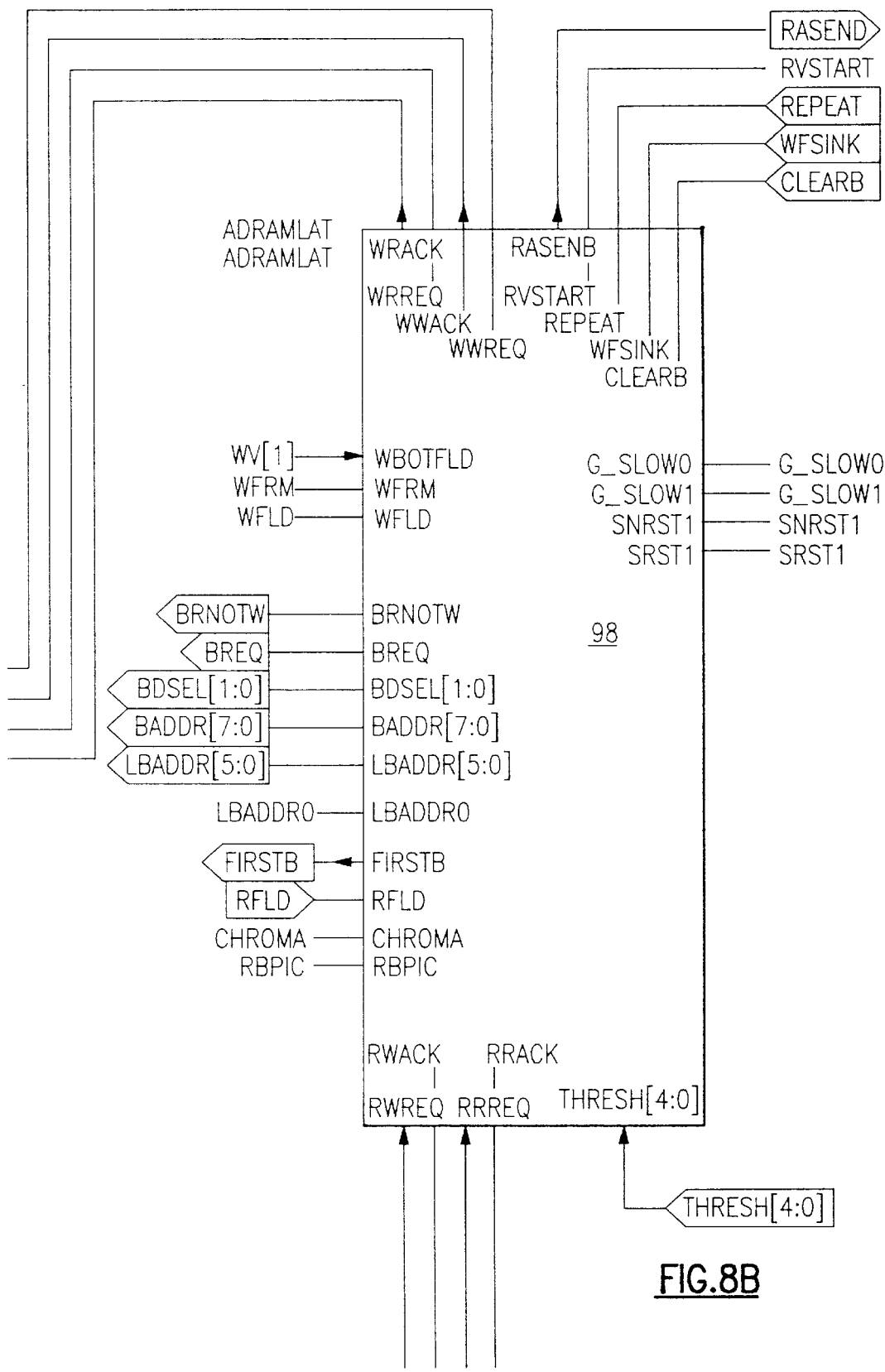
FIG. 8 is an electrical schematic of control circuitry for interfacing with external memory in the memory manager shown in FIG. 7.
Figure 8C:
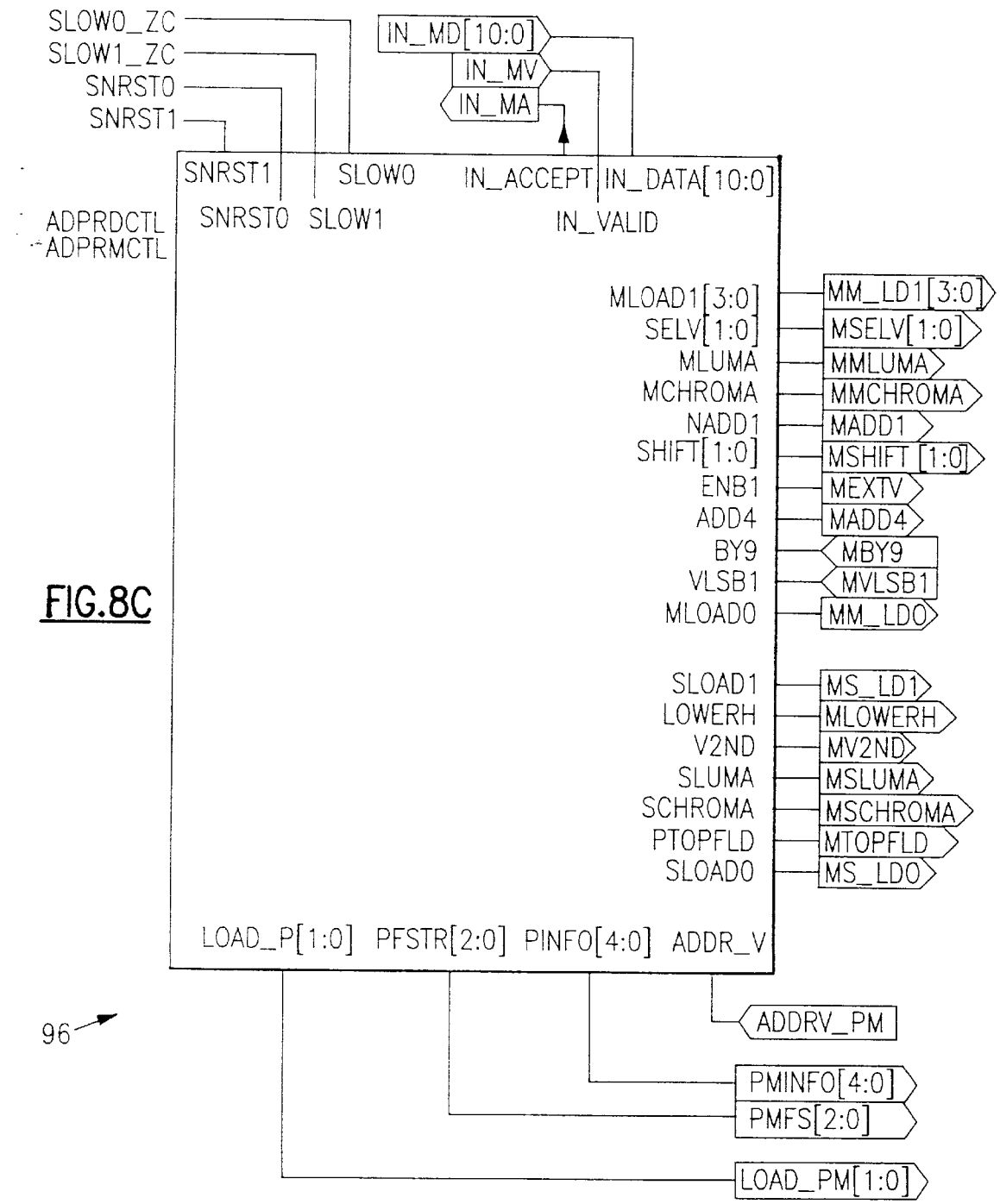
Figure 8D:
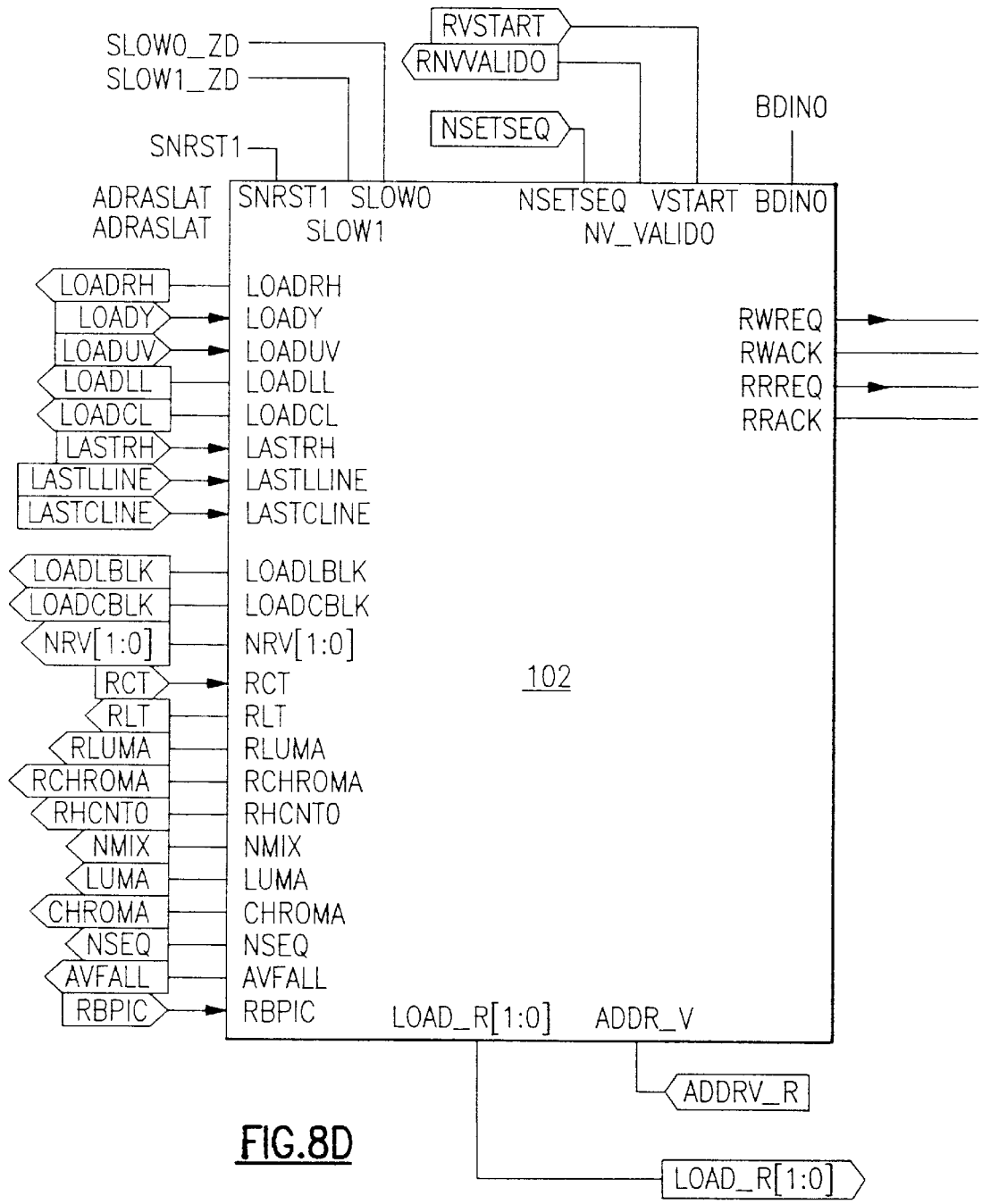
Figure 8E:
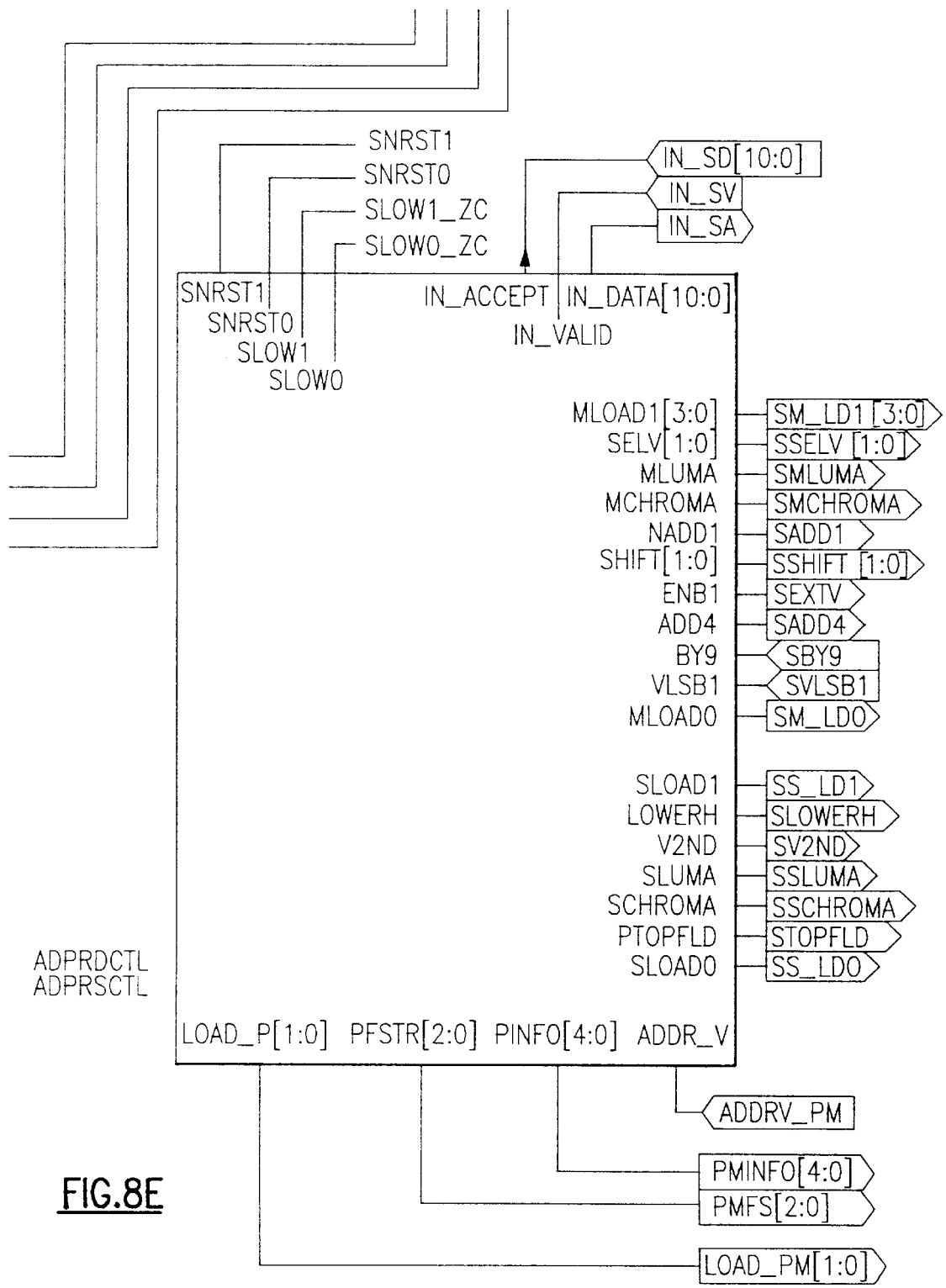

Turning now to FIG. 6, a video formatter 38 of a VLSI MPEG decoder, can receive a given picture on line 40, either as two deinterlaced field pictures, or as a single frame picture of interlaced data. The video formatter 38 is discussed with reference to PAL, since this is the largest picture size presently used; however it also operates with NTSC and can be adapted to other video conventions as well. A video frame is displayed in two segments, or fields, a top field and a bottom field. A PAL picture arrives on the line 40 as a sequential stream of macroblocks, and is stored in an external memory 42, where it is organized in two block rows for each row of macroblocks, for a total of 72 block rows. The data may arrive as one interlaced frame picture (i.e., 45×36 macroblocks), or as two sequential de-interlaced field pictures (i.e. 2×45×18 macroblocks). A frame macroblock contains data from each video display field, two blocks of data from the top field, and two blocks from the bottom field. A field picture macroblock contains 4 blocks of data, all from the same field. In order to manipulate the external memory 42 efficiently each field store is divided into slices of memory which correspond to rows of 8×8 blocks. Thus each slice is a row of 90 blocks, all from the same video field. The largest presently used picture size, 45×36 macroblocks, corresponds to 90×72 blocks. Thus each field store in the external memory 42 must accommodate 36 block rows of data.

According to the invention, the external memory 42 is managed by three cross-coupled FIFOs, connected as shown in FIG. 6. It should be noted that the external memory 42 is preferably virtual memory, but also could be physical memory in a particular application.

The external memory 42 has two banks, $bank_0$ 44, and $bank_1$ 46, which are accessed via a memory interface 48. Data from the top field is stored on $bank_0$ 44, and the data from the bottom field is stored on $bank_1$ 46. A first onchip FIFO, writeback FIFO 50 holds virtual pointers (hereinafter as simply "pointers") to free locations in the external memory 42. The free locations of the external memory 42 may thus have video data written into them. Each of the 36 rows of macroblocks stored in the external memory 42 is represented by a first pointer at location 52 addressing a first block row 54 in $bank_0$ 44, and by a second pointer at location 56 addressing a second block row 58 in $bank_1$ 46. There are thus (36×2) pointers, and thus the writeback FIFO 50 has a depth of 72. The use of the banked external memory 42 in combination with the memory interface 48 is desirable to maximize bandwidth during memory operations of the video formatter 38. It should be emphasized that the writeback FIFO 50 is programmable in length, under control of the microprocessor 60, so that reduced memory operations may be performed.

The other two FIFOs are the "raster" or "used memory" FIFOs, one for each video field. Raster FIFO 62 and raster FIFO 64 are allocated to the top video field and the bottom video field respectively. They hold pointers to slices of the external memory 42 where video data has been written. The raster FIFO 62 and raster FIFO 64 can each hold up to 54 pointers (1.5×36 block rows) for reasons which will become apparent.

In a cycle of operation, before any accesses to the external memory 42 take place, the writeback FIFO 50 is initialized or loaded with pointers to the free slices of the external memory 42. If all 72 slices are to be used for picture storage, the writeback FIFO 50 is loaded with 72 pointers. The raster FIFOs 62, 64 are cleared and are thus empty, indicating that no data has yet been written away for display.

A writeback process 66, which is implemented as a state machine, initially extracts two pointers 68, 70 from the writeback FIFO 50, and then presents a request to the memory interface 48 to store the first two block rows of the arriving picture into the external memory 42 at locations 72, 74, the locations pointed to by the pointers 68, 70. When both block rows have been stored, the writeback process 66 transfers the two pointers 68, 70 into one or both of the raster FIFOs 62, 64 as follows:

Case 1: The video data in the locations 72, 74 is an interlaced frame picture, and one block row consists of top field data, and the other block row consists of bottom field data. The writeback process 66 transfers the pointer 68 into location 76 of the top field raster FIFO 62, and transfers the pointer 70 into location 78 of the bottom field raster FIFO 64.

Case 2: The video data in the locations 72, 74 represents a field picture, and both blocks rows represent data for the same field. If the field was a top field, then both pointers are placed into the top field raster FIFO 62 at location 76 and location 80. A similar event would occur if the field were a bottom field, except that the bottom field raster FIFO 64 would be accessed.

In parallel with the execution of the writeback process 66, a raster process 82, implemented as a state machine, operates in a similar fashion. It extracts a pointer from the one of the raster FIFOs 62, 64. The raster process 82 operates on pointers corresponding to one video field at a time and continues to access data field until the entire field has been retrieved from the external memory 42. Assuming that a top field is desired to be displayed a pointer is extracted from location 84 in the raster FIFO 62. The extracted pointer is used to retrieve a block row from the external memory 42. After the block row is retrieved, the raster process 82 transfers the extracted pointer from location 84 into location 86 of the writeback FIFO 50. The raster process 82 then extracts the next pointer from location 88 of the raster FIFO 62 and proceeds in like manner until the entire top field has been retrieved from the external memory 42. The retrieved video data is accessed via the memory interface 48 and is output on line 90.

The writeback FIFO 50 and the raster FIFOs 62, 64 are cross coupled in that the output of one feeds the input of the other as described above. The system is closed, in that the sum total of the pointers in all three FIFOs at any one time is that number of pointers that was initialized into the writeback FIFO 50. The fact that the pointers are stored in FIFOs provides built-in rate control and anti-clash function. If the writeback FIFO 50 becomes empty, it is because all available memory slices are being used to hold data. The writeback process 66 is then unable to extract more pointers and stalls until pointers again become available from the writeback FIFO 50. Similarly the raster process 82 stalls when the raster FIFOs 62, 64 become depleted of pointers.

It is possible to implement the writeback FIFO 50 and the raster FIFOs 62, 64 on a single RAM and statically or dynamically configure them according to a particular video convention or combination of conventions being handled by the decoder. In the preferred embodiment a total of 180 locations must be provided in the writeback FIFO 50 and the raster FIFOs 62, 64, and they are implemented as a 192 position RAM for convenience. This is satisfactory, because the access of the external memory 42 requires a relatively long time, so that the bandwidth required for the writeback FIFO 50 and the raster FIFOs 62, 64 is relatively low. Dynamic configuration is accomplished by a control microprocessor 60.

The writeback FIFO 50 and the raster FIFOs 62, 64 are initialized at the start of every B picture sequence by adjusting the read and write pointers, and the read-not-written flag order to make the FIFOs appear empty. As the B pictures arrive, the FIFOs 50, 62, 64 are loaded and unloaded in a non-deterministic manner. When a sequence of B pictures has been completed, and the video formatter 38 moves on to process a P-picture, the FIFOs are frozen in their last state, and can resume loading and unloading when a next sequence of B pictures arrives. However in the preferred embodiment it was elected to reinitialize the writeback FIFO 50 and the raster FIFOs 62, 64 at the beginning of every sequence of B pictures in order to provide greater protection against unforeseen errors.

It may be necessary to display a field more than once, for example during frame rate conversion from motion picture film at 24 Hz to NTSC at 30 Hz (referred to herein as "3:2 pulldown operation"). The raster FIFOs 62, 64 are implemented with read and write pointers, and a copy of the FIFO read pointer may be stored at the start of the field retrieval. When the entire field has been retrieved from the external memory 42, the stored read pointer may be used to reset the FIFO read pointer back to the start of the field, so that the field may be accessed a second time. The raster process 82 must be aware that repetitive display is to occur so that the virtual pointers are not passed from the raster FIFOs 62, 64 to the writeback FIFO 50. Transfer of pointers to the writeback FIFO 50 only occurs when the field is accessed for the last time.

The FIFOs 62, 64 are configured for at least 7 bit data, the minimum number for encoding 72 block row pointers. In the preferred embodiment, an 8 bit RAM is employed for convenience.

If sequences of frame pictures alone or field pictures alone were being received by the video formatter 38, the raster FIFOs 62, 64 could be implemented with 36 locations each. However in practice an extra one half field store is required to avoid memory overflow or starvation of the writeback process 66. This is because, according to the MPEG convention, the video formatter 38 must cope with frame pictures irregularly mixed in with field pictures. Also, in practice the raster process 82 can stall, or lag the writeback process 66 by an interval required to store one field (one half frame of data), referred to herein as a "field time".

The case which results in the largest memory loading is the following sequence of B pictures: a preceding field picture and a current frame picture. In this situation, it is necessary to provide storage in each of the FIFOs 62, 64 for one of the fields in the current frame picture, as the writeback process 66 will not have completed its operation on the preceding field B-picture.

Assume that an entire video picture, either a frame picture or two field pictures, has been decoded and stored in the external memory 42 without any of the data having been retrieved for display. In this situation the writeback FIFO 50 is empty and each of the raster FIFOs 62, 64 contains 36 pointers. The system now remains locked until the raster process 82 is instructed to begin displaying a picture. Once the process of displaying a picture begins, memory slices in the raster FIFOs 62, 64 will be freed by the raster process 82 and pointers transferred to the writeback FIFO 50. Further assume that the raster process 82 is displaying the top field of a current field picture, using the top field raster FIFO 62, and that the next picture to be written away is a frame picture. Retrieval of the top field of the current picture frees up 36 block rows for the writeback process 66 to use. The writeback process 66 and the raster process 82 operate at about the same rate, so they are effectively coupled together. Thus, in the time it takes to store an entire picture, both fields may be displayed. However because a frame picture is being stored in parallel with the retrieval of a field picture, 18 block rows will be required for the top field of the following frame picture, and 18 for the bottom field. Because the top field raster FIFO 62 is being emptied by the raster process 82, there is room for the writeback process 66 to place re-used pointers relating to the top field of the following frame picture back into the raster FIFO 62. However the bottom field raster FIFO 64 has not been accessed, and already contains 36 pointers for the bottom field of the current field picture. Therefore enough room must be provided in the raster FIFO 64 to store the additional 18 pointers that will arrive under control of the writeback process 66 as it decodes the following frame picture. Otherwise the writeback process 66 would stall and eventually the entire MPEG decoder would lock up. Hence, to provide for all combinations of the worst cases, the FIFOs 62, 64 must be able to store 54 pointers (54=36+18).

The raster process 82 is driven by a video timing generator (not shown) at a standard display rate of 27 megahertz. The writeback process 66 operates at about the same rate, and effectively couples itself to the raster process 82, so that pointers are being written into the writeback FIFO 50 and the FIFOs 62, 64 as fast as they are being displayed. Provision for the worst case described above implies that in aggregate, the writeback FIFO 50 is never more than ⅔ full at any time.

Figures 9, 9A:
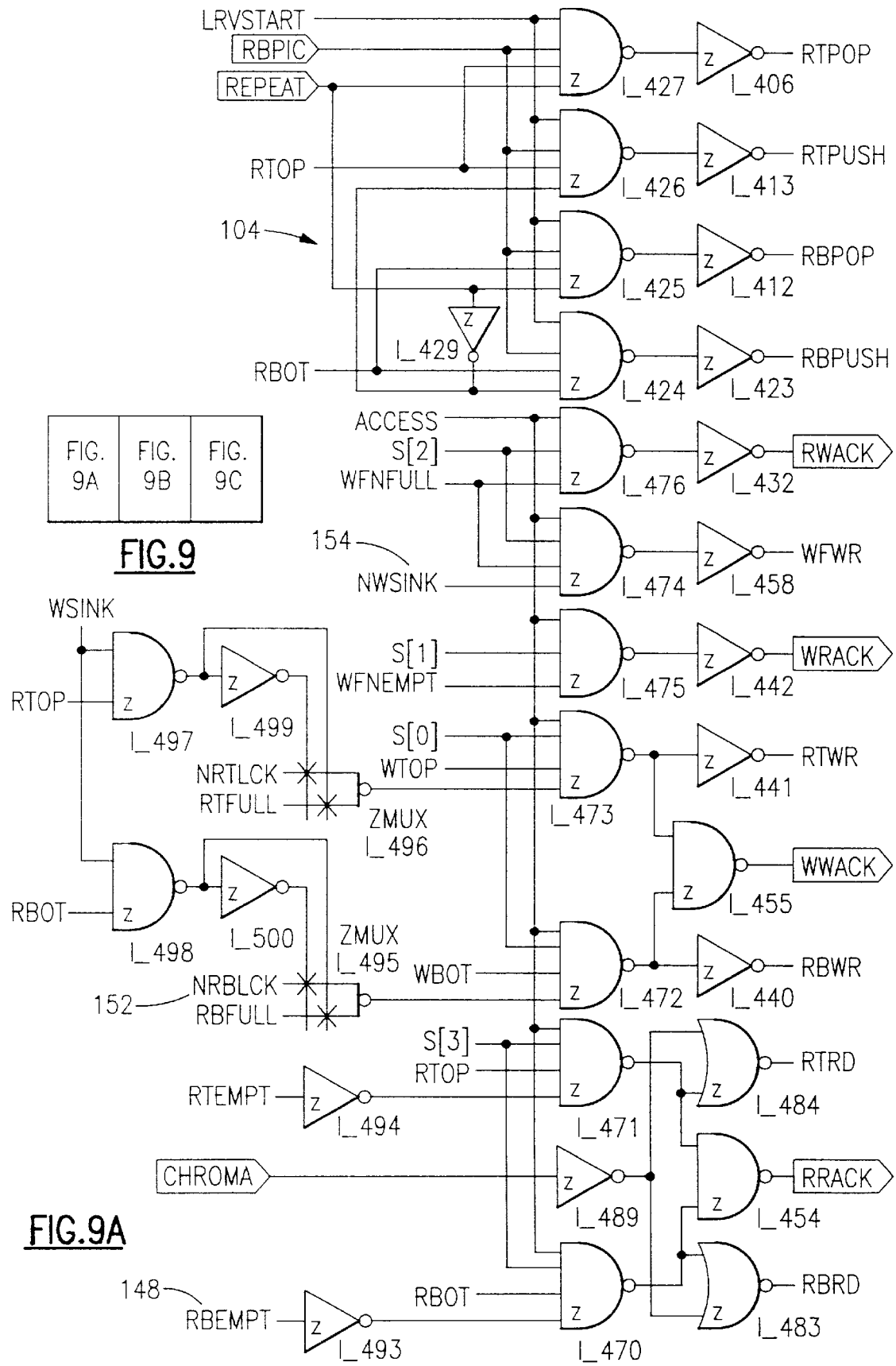
FIG. 9 is a detailed electrical schematic of the memory controller in the control circuitry illustrated in FIG. 8.
Figure 9B:
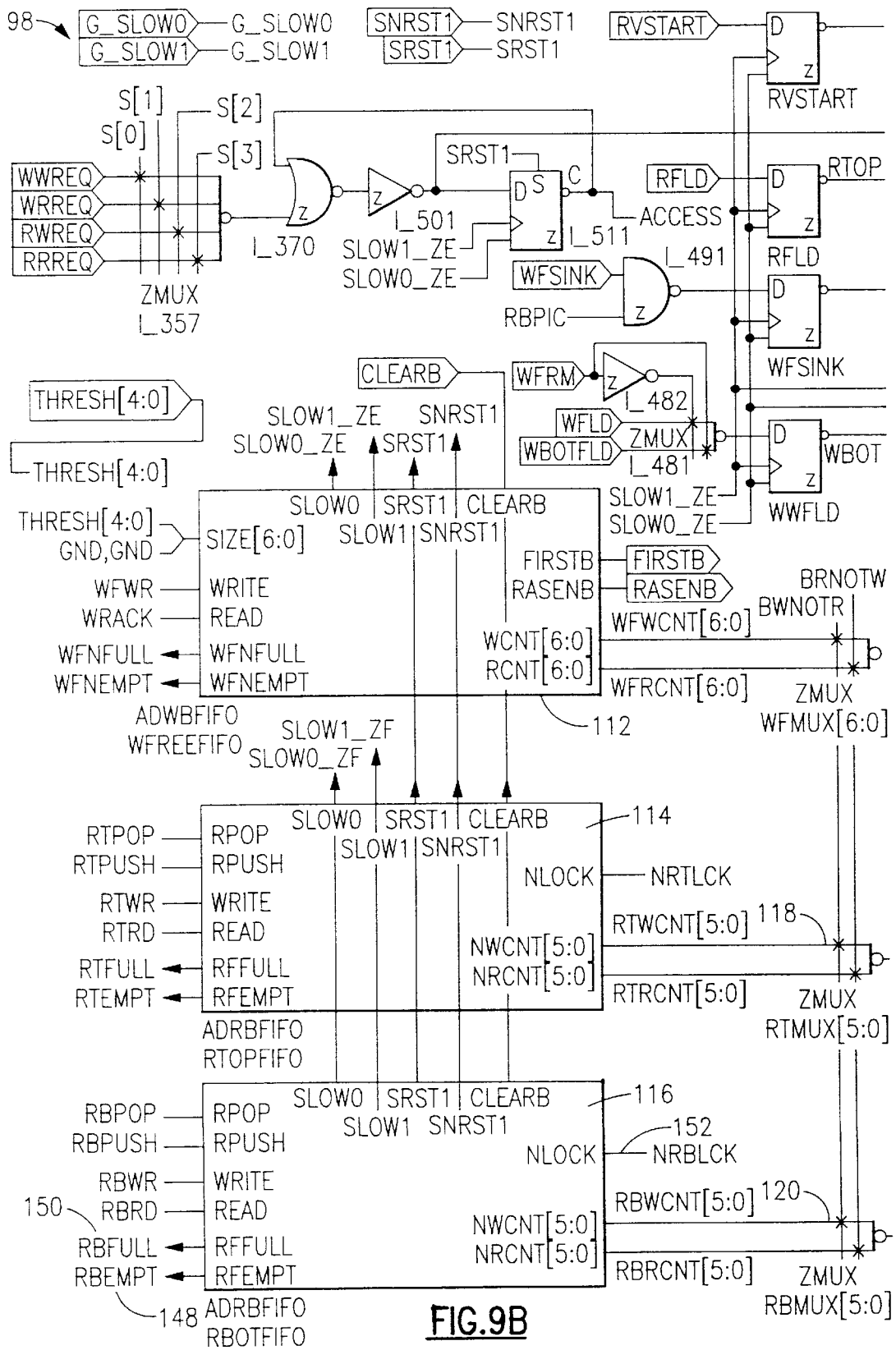
Figure 9C:
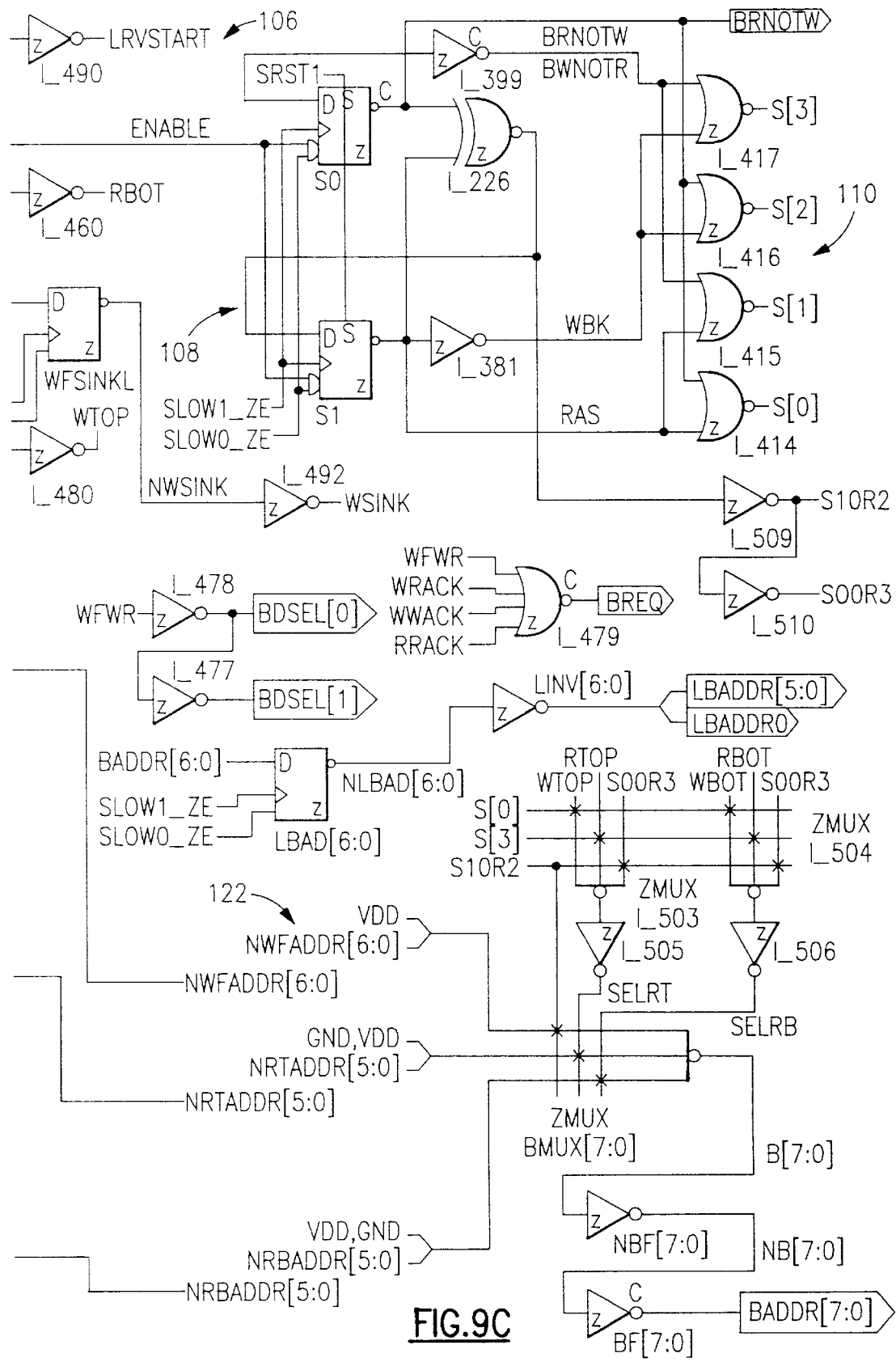

Referring now to FIGS. 7, 8, and 9, a schematic of a preferred embodiment of the invention is shown, implemented in an integrated circuit. The three cross-coupled FIFOs discussed above are configured in a 192×8 bit RAM 94. Block 96 contains the control logic for accessing the RAM 94, and is shown in greater detail in FIG. 8. Memory controller 98 accesses locations within the FIFOs in the RAM 94. Block 100 and the block 102 are state machines for the writeback process and the raster process discussed above, respectively.

The structure of the memory controller 98 is shown in still further detail in FIG. 9. Decoding logical network 104 receives its inputs from the state machines 100, 102 and further decodes the input information. Circuitry 106 comprises a two bit counter 108 which produces a four state output 110, which is the state machine for the RAM controller, and is used to arbitrate among access requests by the writeback and raster processes. The memory controller 98 thus enables reading and writing by the writeback process, and reading and writing by the raster process according to the state of the output 110. Actual memory access by the writeback or raster process must thus await the appropriate state of the output 110. Addresses representing instances of pointers for the three individual FIFOs are provided by FIFO controller 112 for the writeback FIFO, and in two identical circuits, FIFO controllers 114, 116 for the top and bottom field raster FIFOs. A 7-bit bus is connected to FIFO controller 112, as it is necessary to provide for 72 addresses. In the case of FIFO controllers 114, 116, bus 118 and bus 120 connected thereto each have 6 bits, as it is only necessary to address 54 locations in the raster FIFOs. Multiplex circuitry 122 decodes the state of the memory controller 98, and what type of memory access is being requested. The relevant pointers from one of the FIFO controllers 112,114, 116 is then used to access the RAM 94 (FIG. 7).

Figure 10A:
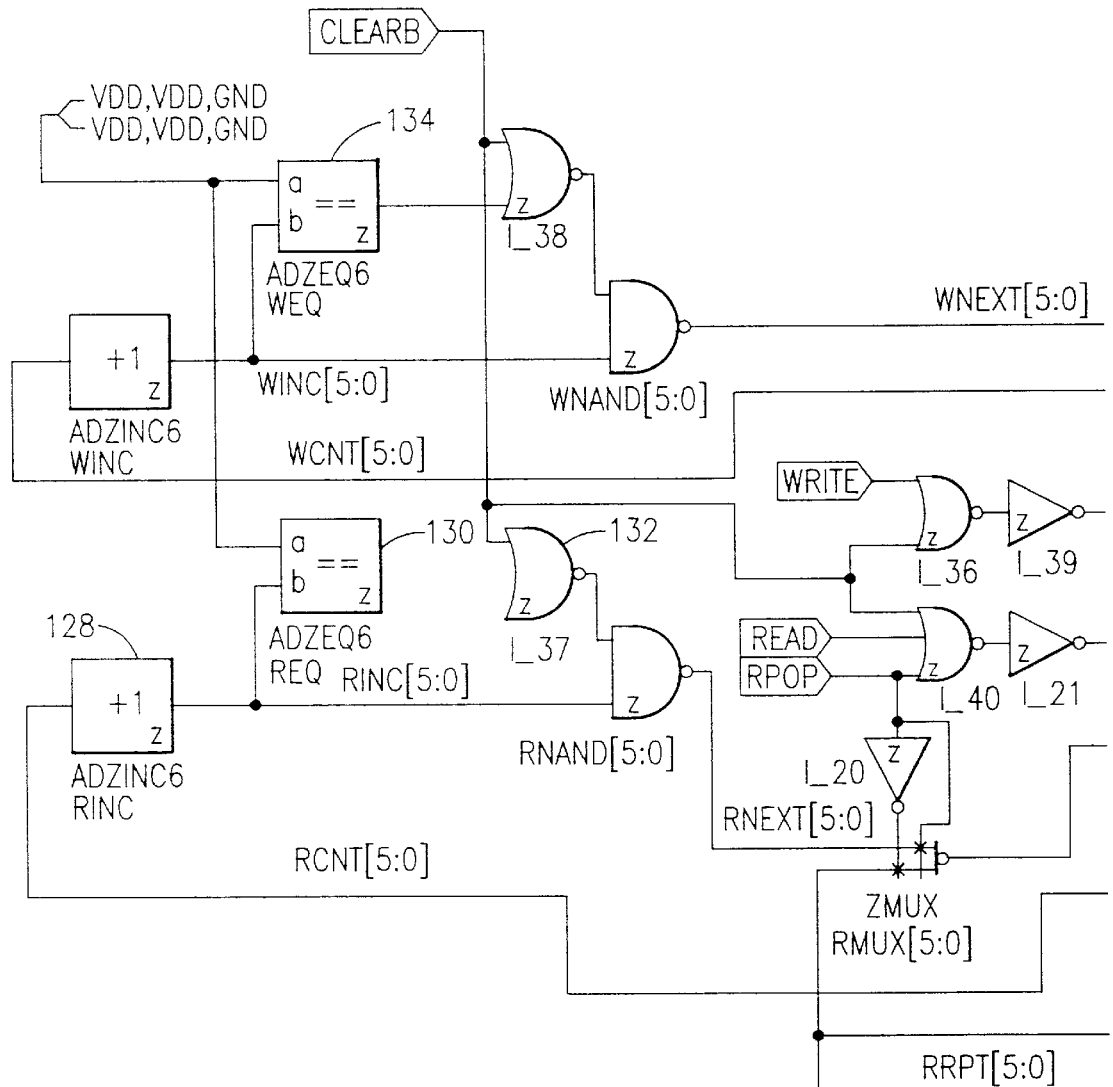
FIG. 10 is a more detailed electrical schematic of the readback FIFO controllers illustrated in the circuitry of FIG. 9.
Figure 10B:
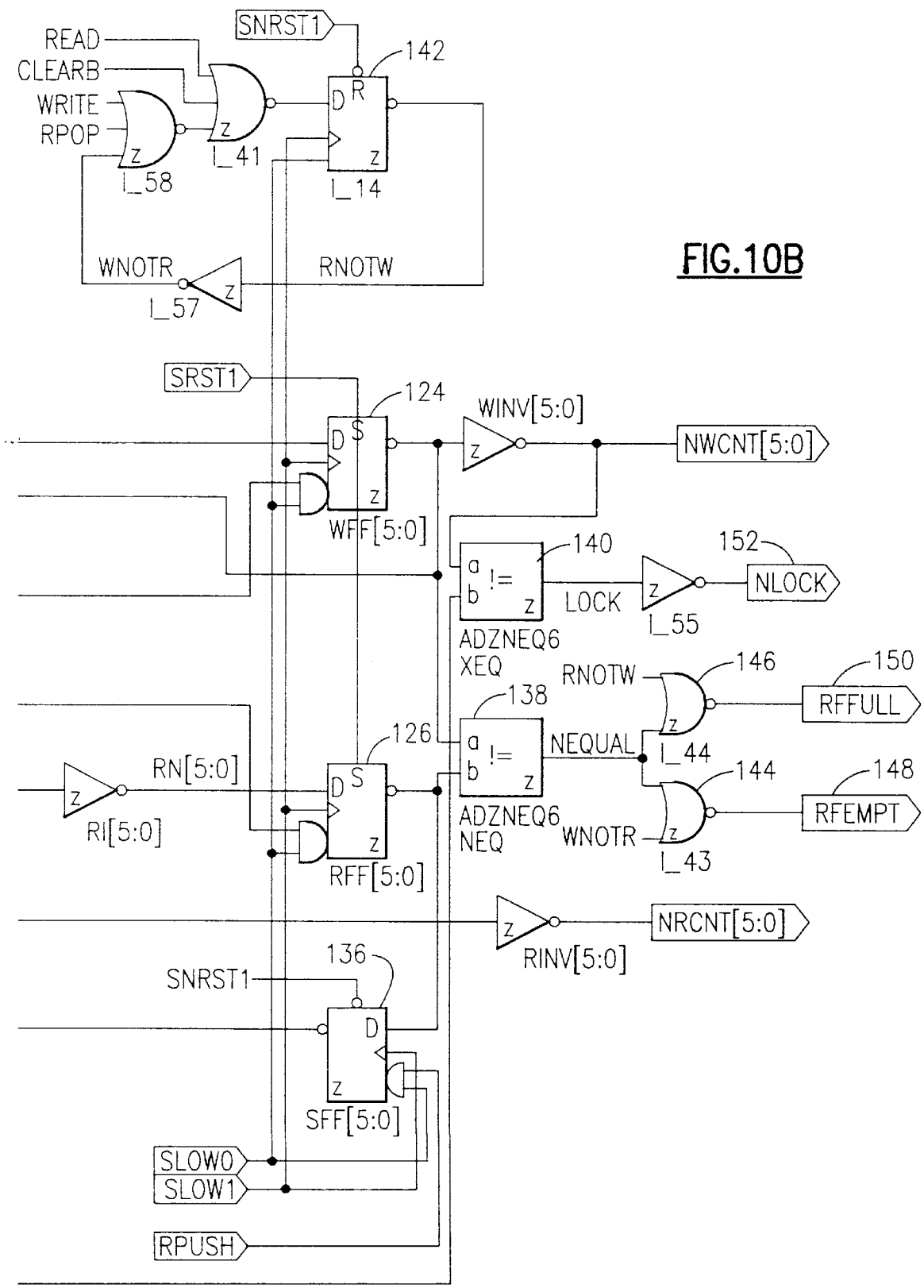

The structure of the readback FIFO controllers 114,116 is illustrated in FIG. 10. Two 6-bit registers 124,126 generate the write and read pointers respectively. The logic associated with the register 126 includes an incrementer 128, a counter 130, and a nand gate 132 for clearing the register 126 when the read pointer reaches its last value. The logic associated with the register 124 is similar and in the interest of brevity the details will not be repeated. The counters 134,130 are used to configure the size of and control access to one of the raster FIFOs 62, 64 (FIG. 6).

An additional register 136 is used to capture and retain the value of the register 126 under certain circumstances, which will be described shortly. Two comparators 138, 140 are present in the circuit in order to compare the values contained in the registers 124, 126, 136. Comparator 138 is used to compare the outputs of the two counter registers 124,126. Comparator 140 compares the outputs of the FIFO write pointer generated by register 124 with the captured or retained value of the read pointer held in register 136. The output of the comparator 138 is used in conjunction with a read-not-written flag, which is implemented as a single flip-flop 142. Using gates 144,146 two status signals 148, 150 are generated, indicating whether the FIFO is full or empty. These status signals are used by the logical network 104 to control how the FIFO is accessed and to prevent write operations when it is full, and to prevent read operations when it is empty.

The output of the comparator 140 is used to generate a "lock" signal NLOCK 152. The signal NLOCK 152 is utilized to control accesses to the raster FIFOs when the display of a field picture is being repeated. This event can occur when the decoder is performing in 3:2 pulldown operation or frame rate conversion, when it is necessary to effectively mark time by displaying an extra field. Instead of displaying both fields of a video picture just once, the first field is redisplayed or repeated after both fields have been displayed. For example first the top field is displayed, then the bottom field, and then the top field is displayed again. Under this circumstance it is desirable to preserve the contents of external memory for redisplaying one of the video fields. In order that the data in external memory is not freed up and overwritten once it has been displayed, the lock signal NLOCK 152 causes the write pointer of the raster FIFO to freeze, so that the read pointer can be reloaded for redisplay. When it is time to redisplay the first field, the value captured in the register 136 is loaded into the register 126, which has the effect of resetting the read pointer back to the start of the first field, so that it may be accessed a second time. The logical network 104 interprets the signal NLOCK 152 as an indication that the write pointer held in the register 124 is the same as the read pointer captured in the register 136, and that if the field is to be redisplayed, then additional FIFO write operations should be blocked in order to prevent the first data field from being overwritten. The first field data is thus preserved in external memory until it has been redisplayed a second time.

Referring again to FIGS. 6, 8 and 9, a signal NWSINK 154 operates in combination with the signal NLOCK 152. The signal NWSINK 154 is active during 3:2 pulldown or frame rate conversion and is asserted during the display of the first field if that field is to be redisplayed. The signal NWSINK 154 inhibits write instructions to the writeback FIFO controller 112 which originate from the raster process state machine 102. This is necessary because when the first picture field is displayed, the data slices in external memory must not be freed up and placed back into the writeback FIFO 50. During the display of the second field, or the redisplay of the first field, the signal NWSINK 154 is inactive, thus allowing the state machine 102 to cause writes to the writeback FIFO 50 so that the pointers to the free memory slices are placed therein.

Figures 11, 11A:
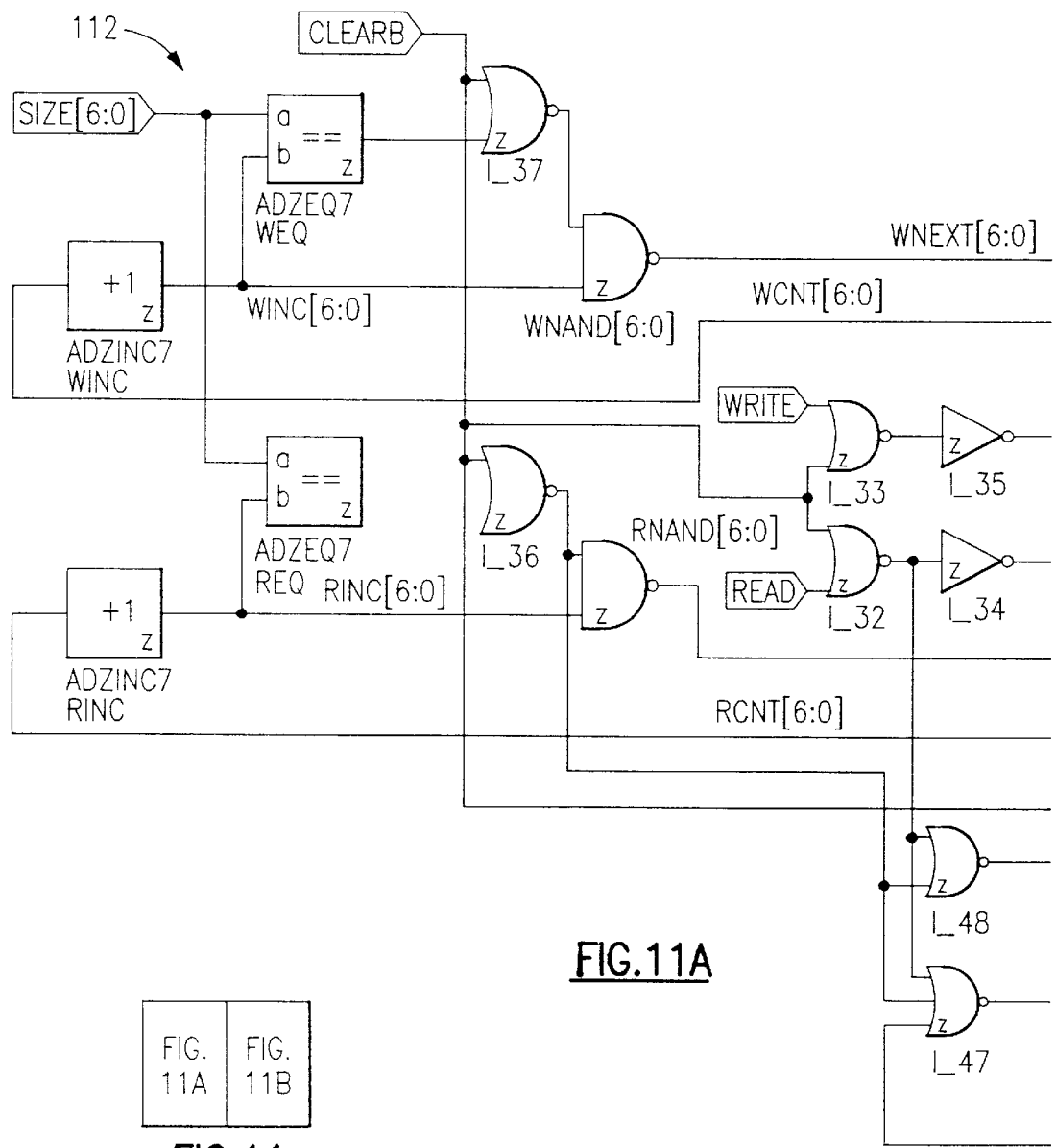
FIG. 11 is a more detailed electrical schematic of the writeback FIFO controller illustrated in the circuitry of FIG. 9.
Figure 11B:
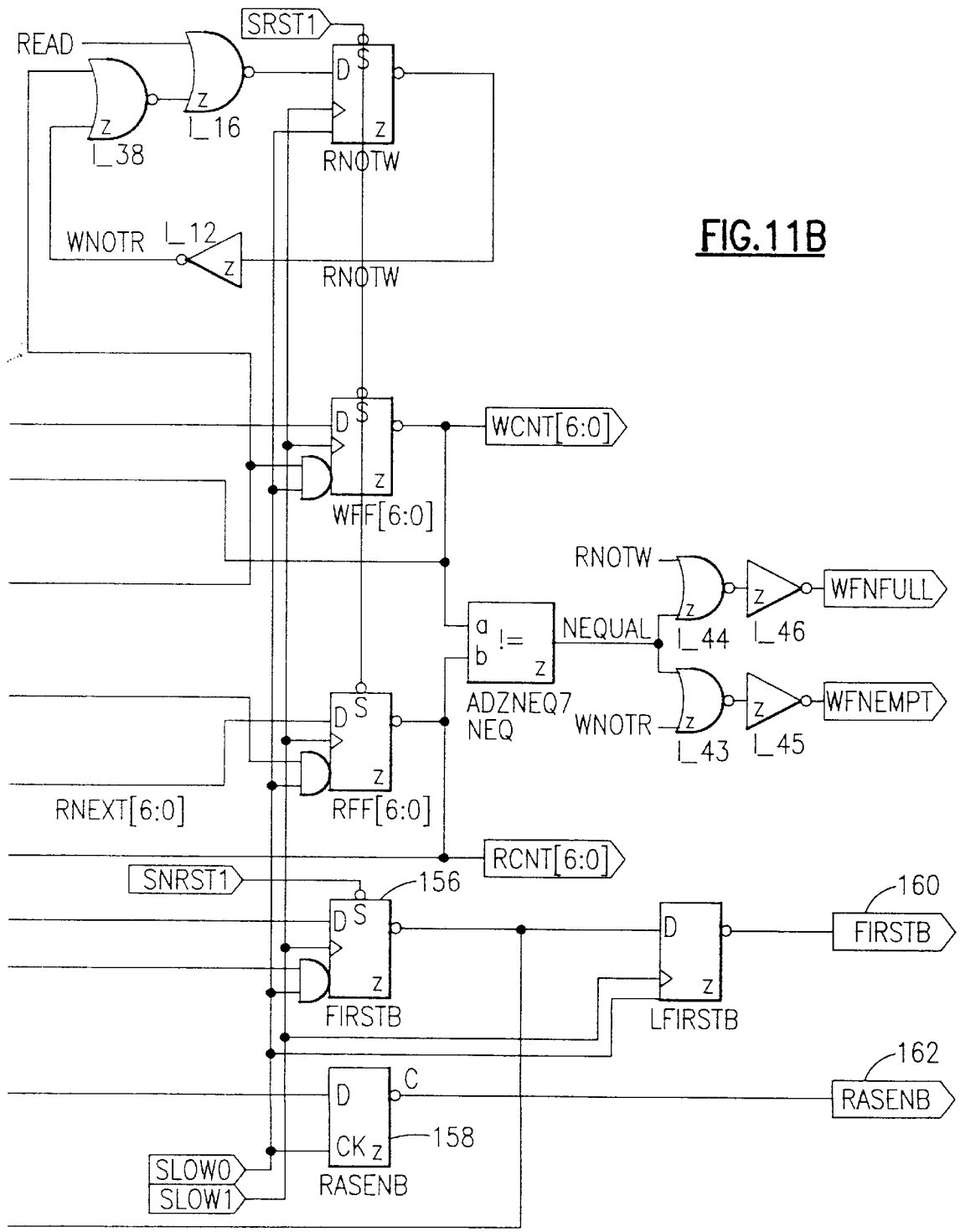

FIG. 11 illustrates the structure of the writeback FIFO controller 112, which is very similar to that of the readback FIFO controllers, except that there is no additional register to capture the read pointer value for field redisplays. A control flip-flop 156 simplifies the writeback operation when the writeback FIFO is first accessed for a first B-type picture of a sequence. The flip-flop 156 is set and its output is active during the display of the very first B-picture in a sequence of B-pictures. This forces the state machine logical network 104 (FIG. 9) to reference the actual address of the FIFO rather than the contents of the external memory held at that address. This has the effect of causing the memory controller 98 to preload the external memory with the picture slice sequence. Setting the flip-flop 156 results in a control signal 132, which avoids the need for having a state machine that would clear the external RAM, and then preload it with the initial virtual pointers for the picture slice sequence. The flip-flop 156 is reset after the first B-picture has been displayed and is only set again at the start of a new B-picture sequence. Another control flip-flop 158 develops a control signal RASENB 160 which is used by the writeback process to synchronize the raster process. The flip-flop 158 is set before the B-picture sequence starts, and is reset when the writeback FIFO 50 (FIG. 6) is emptied for the first time. The output of the flip-flop 158, control signal FIRSTB 162 indicates to the raster state machine 102 when it should begin to start displaying the B-pictures. It is asserted when it is desired that the raster process lag the writeback by one field time (or one half frame store). This lag is optimal for smooth operation of the system.

Figure 12:
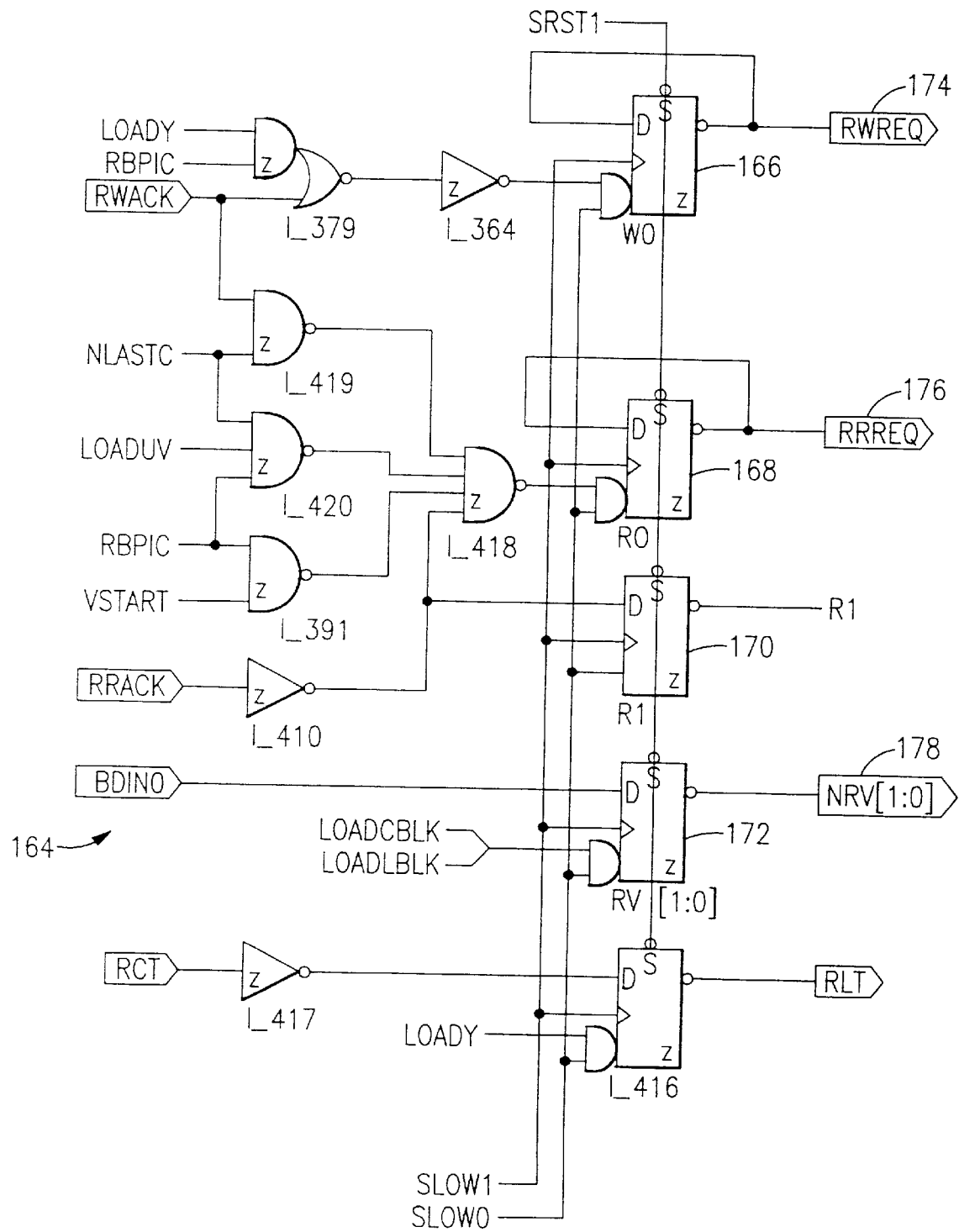
FIG. 12 is a more detailed electrical schematic of a state machine in the circuitry of FIG. 8.

FIG. 12 illustrates the state machine 164 which controls access into the RAM 94 (FIG. 7). It consists of flip-flops 166, 168,170, 172, and associated logic. Signal 174, signal 176, and signal 178 enable read requests and write request by the raster process, and the writeback process.

FIFO memories work quite well in a VLSI implementation for managing the pointers, as disclosed above. However it is possible to realize the three cross-coupled memories using memory management arrangements other than the FIFO without departing from the spirit of the invention. For example the pointers could be written into and extracted from the three cross-coupled memories using hash tables, linked lists of memory locations, caches, and many other forms of indirect addressing, as are known to the art. Alternate pointer memory schemes may rely on the fact that it is not essential for the raster process to extract pointers in the same order they were written into the raster memories by the writeback process, so long as a closed system of pointers is maintained.

Referring again to FIG. 6, the writeback FIFO 50, and the raster FIFOs 62, 64 are preferably implemented as a single port static RAM array for circuit power considerations, and because it requires a small silicon area. A register file would also be suitable, and a content addressable memory could also be used for the three FIFOs.

While this invention has been explained with reference to the structure disclosed herein, it is not confined to the details set forth and this application is intended to cover any modifications and changes as may come within the scope of the following claims:

What is claimed is:

1. A video decoder comprising:
    a spatial decoder connected to a source of coded video data;
    a temporal decoder;
    a video formatter, receiving data from at least one of said temporal decoder and said spatial decoder, wherein said temporal decoder and said spatial decoder define a data source,
    a data memory for storing the received data,
    the improvement comprising:
        a writeback memory, a first raster memory, and a second raster memory, wherein pointers to said data memory are stored in said writeback memory, said first raster memory, and said second raster memory;
        a memory interface coupled to said data source, said data memory, said writeback memory, said first raster memory, and said second raster memory;
        a writeback control circuit, for extracting pointers from said writeback memory, wherein said extracted pointers are presented to said memory interface, and said received data is stored in locations of said data memory that are specified by said pointers, said extracted pointers being transferred to a said raster memory; and a raster control circuit, for re-extracting said transferred pointers from a said raster memory for presentation to said memory interface, wherein said stored received data is read from said data memory, and said re-extracted pointers are returned to said writeback memory.

2. The video decoder according to claim 1, wherein said pointers are virtual memory pointers.

3. The video decoder according to claim 1, wherein said writeback memory, said first raster memory, and said second raster memory are FIFOs.

4. The video decoder according to claim 3, wherein said FIFOs are statically configured.

5. The video decoder according to claim 3, further comprising control circuitry for dynamically configuring said FIFOs.

6. The video decoder according to claim 1, wherein said writeback memory, said first raster memory, and said second raster memory are realized as a single RAM.

7. The video decoder according to claim 1, wherein said writeback memory, said first raster memory, and said second raster memory are realized as a content addressable memory.

8. The video decoder according to claim 1, wherein said writeback memory, said first raster memory, and said second raster memory are realized as a register file.

9. The video decoder according to claim 1, wherein said data memory has a plurality of banks.

10. The video decoder according to claim 1, wherein a number of locations in said writeback memory is smaller than a sum of locations in said first raster memory and said second raster memory.

11. A video decoder comprising:

a spatial decoder connected to a source of coded video data;

a temporal decoder;

a video formatter, receiving data from at least one of said temporal decoder and said spatial decoder, wherein said temporal decoder and said spatial decoder define a data source, a data memory for storing the received data, the improvement comprising:

a closed memory system comprising cross-coupled FIFO memories for storage of pointers to said data memory, the FIFO memories being a writeback memory, a first raster memory, and a second raster memory, said FIFO memories each having a read pointer, a write pointer, and a status flag;

control circuitry for initializing said read pointers, said write pointers, and said status flags of said FIFO memories;

a memory interface coupled to said data source, said data memory, said writeback memory, said first raster memory, and said second raster memory;

a writeback control circuit, for extracting pointers from said writeback memory, wherein said extracted pointers are presented to said memory interface, and said received data is stored in locations of said data memory according to said pointers, said extracted pointers being transferred to a said raster memory; and a raster control circuit, for re-extracting said transferred pointers from a said raster memory for presentation to said memory interface, wherein said stored received data is read from said data memory, and said re-extracted pointers are returned to said writeback memory.

12. The video decoder according to claim 11, wherein said pointers are pointers to a virtual data memory.

13. The video decoder according to claim 11, further comprising a first control circuit for dynamically configuring a storage capacity of at least one of said FIFO memories.

14. The video decoder according to claim 11, further comprising a second control circuit that asserts a lock signal when a decoded video field is required to be redisplayed by said video formatter, wherein said write pointer of a said raster FIFO is held stationary in response to said lock signal.

15. The video decoder according to claim 11, wherein said writeback memory, said first raster memory, and said second raster memory are realized as a single RAM.

16. The video decoder according to claim 11, wherein said writeback memory, said first raster memory, and said second raster memory are realized as a content addressable memory.

17. The video decoder according to claim 11, wherein said writeback memory, said first raster memory, and said second raster memory are realized as a register file.

18. The video decoder according to claim 11, wherein said data memory has a plurality of banks.

19. The video decoder according to claim 11, wherein a number of locations in said writeback memory is smaller than a sum of locations in said first raster memory and said second raster memory.

20. In a video decoder system of the type having a spatial decoder, a temporal decoder, and a video formatter, a method of managing a memory holding decoded video data for display thereof, comprising the steps of:

decoding MPEG encoded video data in at least one of said spatial decoder and said temporal decoder, wherein said decoded data represents a picture to be displayed;

providing a data memory for said decoded video data;

storing pointers to locations of said data memory in a writeback memory;

extracting said stored pointers from said writeback memory;

writing said received video data into locations of said data memory that are specified by said extracted pointers;

transferring said extracted pointers to at least one of a first raster memory and a second raster memory, wherein pointers stored in said first raster memory correspond to decoded video data of a first video display field, and pointers stored in said second raster memory correspond to decoded video data of a second video display field;

reading data from locations of said data memory that are specified by said transferred pointers;

outputting said read data for display thereof; and returning said transferred pointers to said writeback memory.

21. The method according to claim 20, wherein said steps of extracting said pointers, writing said received video data are performed while performing said steps of transferring said extracted pointers, reading data, outputting said read data, and returning said extracted pointers.

* * * * *